(12) United States Patent
Spink et al.

(10) Patent No.: US 10,957,929 B2
(45) Date of Patent: Mar. 23, 2021

(54) FUEL CELL STACK

(71) Applicant: PLUG POWER INC., Latham, NY (US)

(72) Inventors: Scott Spink, Spokane, WA (US); David Lott, Spokane, WA (US); Arrol Bryant, Spokane, WA (US)

(73) Assignee: Plug Power Inc., Latham, NY (US)

( * ) Notice: Subject to any disclaimer, the term of this patent is extended or adjusted under 35 U.S.C. 154(b) by 4 days.

(21) Appl. No.: 16/351,020

(22) Filed: Mar. 12, 2019

(65) Prior Publication Data

US 2020/0295393 A1 Sep. 17, 2020

(51) Int. Cl.
*H01M 8/04955* (2016.01)
*H01M 8/04858* (2016.01)
*H01M 8/04537* (2016.01)

(52) U.S. Cl.
CPC ..... *H01M 8/04955* (2013.01); *H01M 8/0488* (2013.01); *H01M 8/0491* (2013.01); *H01M 8/04559* (2013.01); *H01M 8/04589* (2013.01)

(58) Field of Classification Search
CPC .......... H01M 8/04955; H01M 8/0488; H01M 8/04589; H01M 8/04559; H01M 8/0491
See application file for complete search history.

(56) References Cited

U.S. PATENT DOCUMENTS

| | | | |
|---|---|---|---|
| 6,096,449 A | 8/2000 | Fuglevand et al. | |
| 6,620,538 B2 | 9/2003 | Bai et al. | |
| 6,805,987 B2 | 10/2004 | Bai et al. | |
| 6,811,906 B2 | 11/2004 | Bai et al. | |
| 6,828,050 B2 | 12/2004 | Bai et al. | |
| 6,913,845 B2 * | 7/2005 | Bekkedahl | H01M 4/9083 429/429 |
| 6,982,129 B1 | 1/2006 | Bai et al. | |
| 7,049,017 B2 | 5/2006 | Bai et al. | |
| 7,722,972 B2 | 5/2010 | Bai et al. | |
| 10,260,157 B2 * | 4/2019 | Blanchet | C25B 1/08 |

* cited by examiner

*Primary Examiner* — Carlos Barcena
(74) *Attorney, Agent, or Firm* — Heslin Rothenberg Farley & Mesiti P.C.; Victor A. Cardona, Esq.

(57) ABSTRACT

A fuel cell system includes a first plurality of fuel cells having a cathode and an anode. The plurality of fuel cells is configured to produce electrical power having a current and a voltage output. The plurality of fuel cells includes a first conductive plate and a second conductive plate. A shunt is electrically connected to the first conductive plate and the second conductive plate for shunting voltage output between the cathode and the anode. The shunt is mounted to, and supported by, the plurality of fuel cells. The shunt is connected to a control mechanism to control a shorting of one or more fuel cells of the plurality of fuel cells. The control mechanism is mounted to, and supported by, the plurality of fuel cells.

20 Claims, 20 Drawing Sheets

FUEL CELL STACK

CROSS-REFERENCE TO RELATED APPLICATION

This application is related to U.S. Pat. No. 7,722,972, issued May 25, 2010, entitled "Apparatus and Method For Controlling A Fuel Cell Using The Rate Of Voltage Recovery", the entire disclosure of which is incorporated herein by reference.

This application is related to U.S. Pat. No. 6,096,449, issued Aug. 1, 2000, entitled "Fuel Cell And Method For Controlling Same", the entire disclosure of which is incorporated herein by reference.

This application is related to U.S. Pat. No. 6,982,129, issued Jan. 3, 2006, entitled "Method And Apparatus For Monitoring Equivalent Series Resistance And For Shunting A Fuel Cell", the entire disclosure of which is incorporated herein by reference.

This application is related to U.S. patent application Ser. No. 15/388,517, filed Dec. 22, 2016, entitled "Fuel Cell Stack", the entire disclosure of which is incorporated herein by reference.

This application is related to U.S. patent application Ser. No. 15/388,547, filed Dec. 22, 2016, entitled "Fuel Cell Stack", the entire disclosure of which is incorporated herein by reference.

TECHNICAL FIELD

This invention relates in general to electrochemical cells, and more particularly to fuel cells systems and methods.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. These are commonly referred to as bipolar plates (hereinafter "BPP"). Alternately, the anode plate of one cell is electrically connected to the separate cathode plate of an adjacent cell. Commonly these two plates are connected back to back and are often bonded together (e.g., bonded by adhesive, weld, or polymer). This bonded pair becomes as one, also commonly called a bipolar plate, since anode and cathode plates represent the positive and negative poles, electrically.

Such a series of connected multiple fuel cells is referred to as a fuel cell stack or fuel cell system. The stack typically includes means for directing the fuel and the oxidant to the anode and cathode flow field channels, respectively. The stack usually includes a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack also includes an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions.

In U.S. Pat. No. 6,096,449 to Fuglevand et al., the inventors disclosed a shunt controller which is electrically coupled with a fuel cell and which at times shunts electrical current between the anode and cathode of the fuel cell to achieve various benefits including boosting the electrical power output of same. It is speculated that this repeated, and periodic shorting causes each of the fuel cell membranes to be "conditioned", that is, such shorting is believed to cause an increase in the amount of water that is made available to the membrane electrode diffusion assembly (MEDA) of the fuel cell thereby increasing that assembly's performance. Additionally, it is also conceivable that the shorting provides, at least in part, a short term increase in heat output that is sufficient to evaporate excess water from associated diffusion layers that are mounted on or made integral with the membrane electrode diffusion assembly.

In U.S. Pat. No. 6,620,538, and which is incorporated by reference herein, a fuel cell power system was described and which included circuitry which was configured to measure the equivalent series resistance (ESR) of the fuel cell in timed relation to the shorting as described in the earlier U.S. Pat. No. 6,096,449. This equivalent series resistance (ESR) was then employed to adjust the operation of the fuel cell in order to optimize the hydration, and other operational characteristics of the fuel cell. Thus, there is a need for improved fuel cell systems and improved methods of manufacturing fuel cells that efficiently connect and arrange component parts of a fuel cell to each other to improve operational efficiency.

SUMMARY OF THE INVENTION

The present invention provides a fuel cell including a first plurality of fuel cells having a cathode and anode. The plurality of fuel cells is configured to provide electrical power having a current and a voltage output. The plurality of fuel cells includes a first conductive plate and a second conductive plate. A shunt is electrically connected to the first conductive plate and the second conductive plate for shunting voltage output between the cathode and the anode. The shunt is mounted to, and supported by, the plurality of fuel cells. The shunt is connected to a control mechanism to control a shorting of one or more fuel cells of the plurality of fuel cells. The control mechanism is mounted to, and supported by, the plurality of fuel cells.

The present invention provides, in a second aspect, a method for controlling a fuel cell system which includes providing a plurality of fuel cells having a cathode and an anode. The plurality of fuel cells is configured to produce electrical power having a current and voltage output. A shunt is mounted to the plurality of fuel cells such that the shunt is supported by the plurality of fuel cells. The shunt is electrically connected to a first conductive plate and a second conductive plate of the plurality of fuel cells for shunting voltage output between the cathode and the anode. A control mechanism controls a shorting of one or more of the fuel cells of the plurality of fuel cells and is mounted to, and supported by, the plurality of fuel cells.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

In accordance with the principles of the present invention, fuel cell systems and methods are provided.

Figure 1:
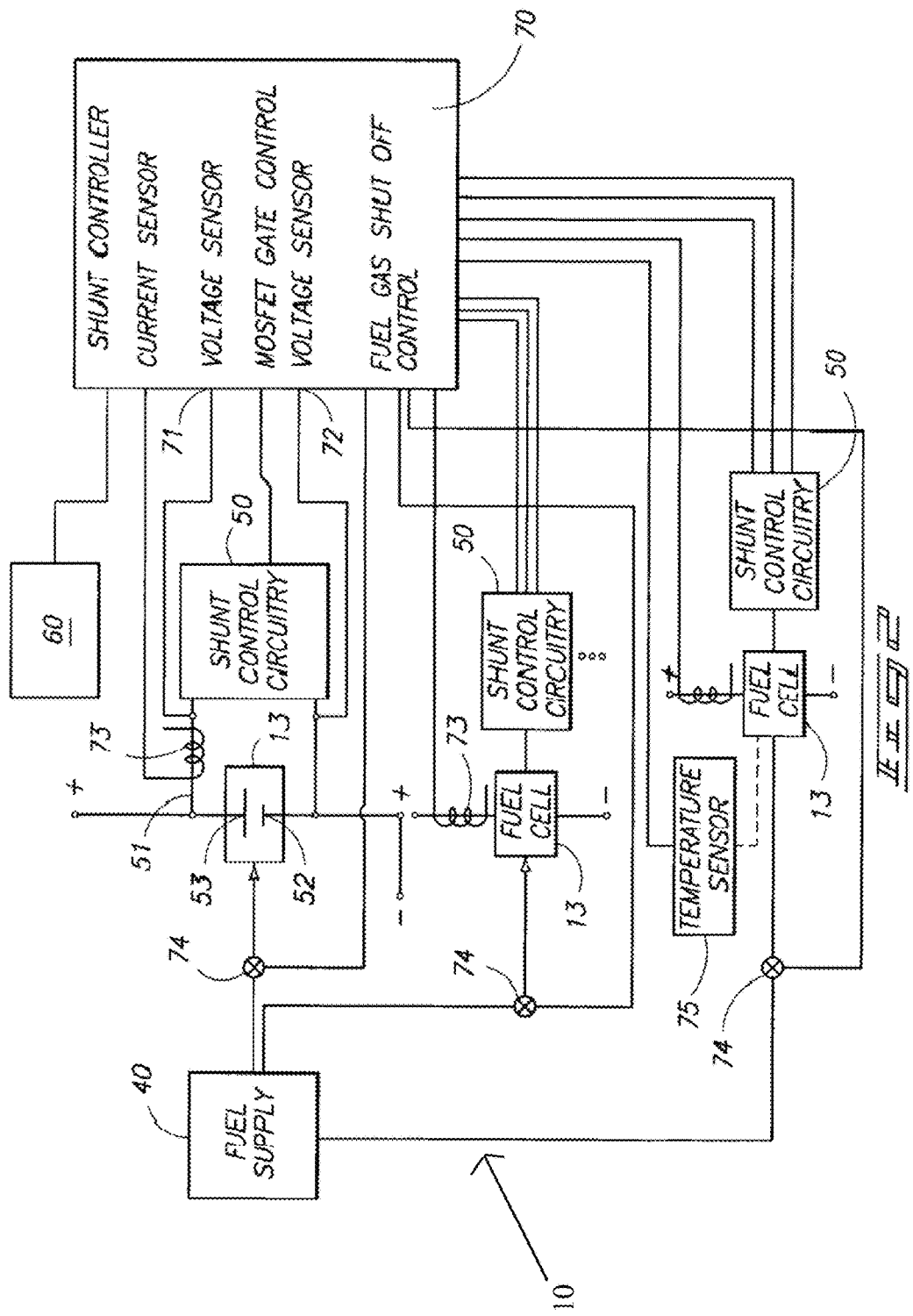
FIG. 1 is a block diagram of a fuel cell system in accordance with the invention.

As depicted in FIG. 1, a fuel cell system 10 may include a plurality of fuel cells (e.g., a fuel cell 13) are configured to produce electrical current having a given voltage and current output. In the example shown in FIG. 2, only a few instances of fuel cell 13 are illustrated for the sake of simplicity. However, in actuality, a plurality of fuel cells 13 are provided, which can be coupled together in series, parallel or a combination of series/parallel arrangements. More particularly, one or more instances of fuel cell 13 may be present in a fuel cell system, such as fuel cell system 10 as seen in FIG. 1. Fuel cell system 10 additionally may include shunt control circuitry 50.

Fuel cell 13 includes an anode 52 and a cathode 53. A shunt control circuitry may be employed for selectively shorting anode 52 to cathode 53 so as to simultaneously increase a current and decrease a voltage output of the fuel cell 13; and the second circuitry is employed, as will be discussed hereinafter, for measuring the rate of voltage recovery following the shorting, and wherein the rate of voltage recovery is employed, at least in part, to control and/or monitor the operation of the fuel cell.

Figure 2:
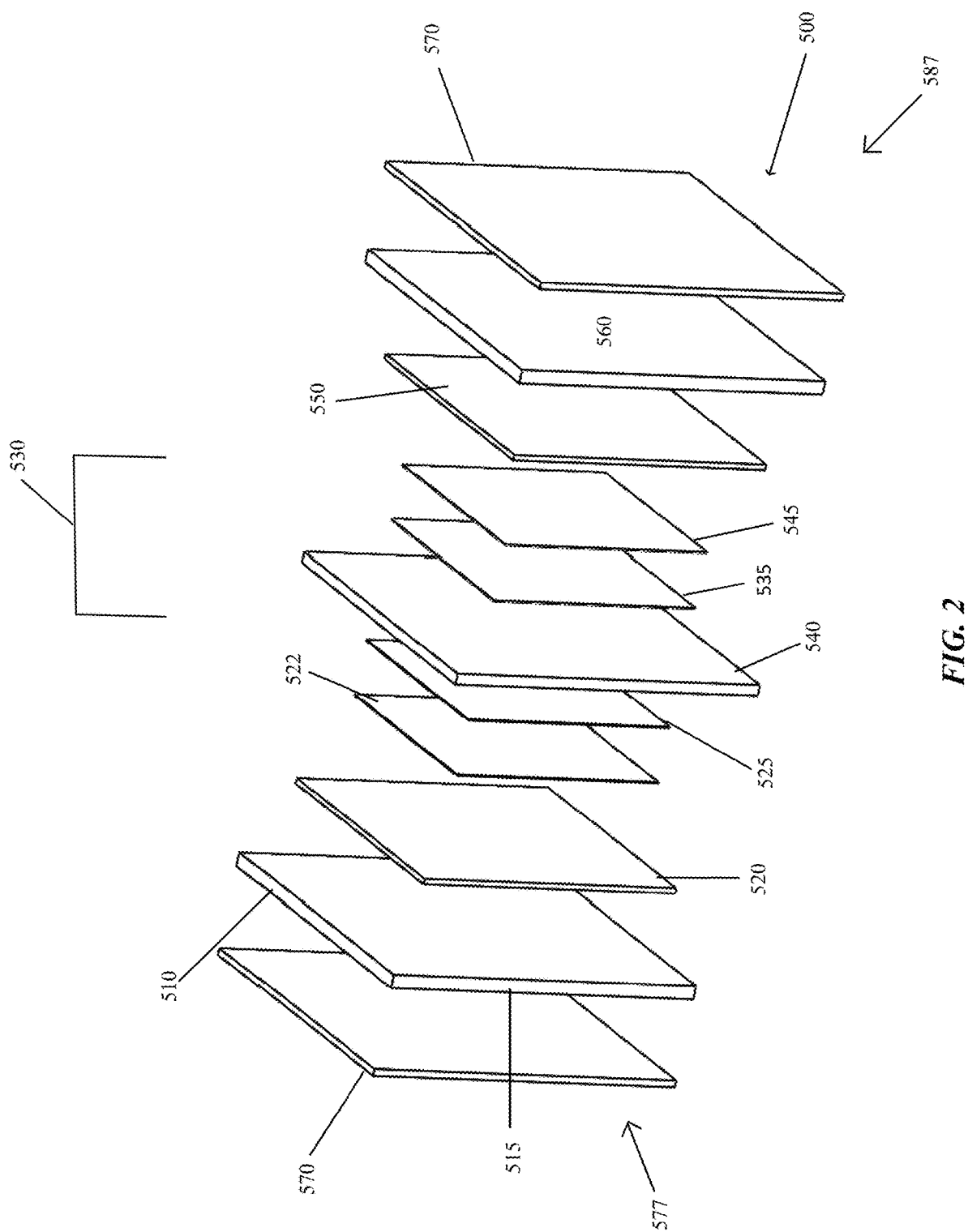
FIG. 2 is a perspective view of a portion of a fuel cell of the fuel cell system of FIG. 1.

FIG. 2 depicts an exploded simplified schematic of an internal subassembly 500 of fuel cell 13 of FIG. 1 including a cathode side 577 and an anode side 587. Cathodic end fluid flow plate 510 may be located at an outer end 515 and a flow plate seal 520 on an inner side thereof. A membrane electrode assembly (MEA) 530 is located between seal 520 and a second flow plate seal 550. An anode flow plate 560 is on a second end 565 of subassembly 500.

MEA 530 includes a membrane 540 between a cathode side catalyst layer 525 and an anode side catalyst layer 535. A cathode side gas diffusion layer (GDL) 522 is located between cathode side catalyst layer 525 and flow plate 510. An anode side gas diffusion layer 545 is located between anode side catalyst layer 535 and flow plate 560. Seal 520 and seal 550 may be received in a channel of on an inner side of flow plate 510 and flow plate 560, respectively. Current collector plates 570 are located on opposite ends of fuel cell 13 and may include outwardly extending portions (not shown in FIG. 2) for coupling with conducting members external to fuel cell 13, such as a shunt as described below. As indicated, above multiple instances of fuel cell 13 may be present in fuel cell system 10.

Figure 3:
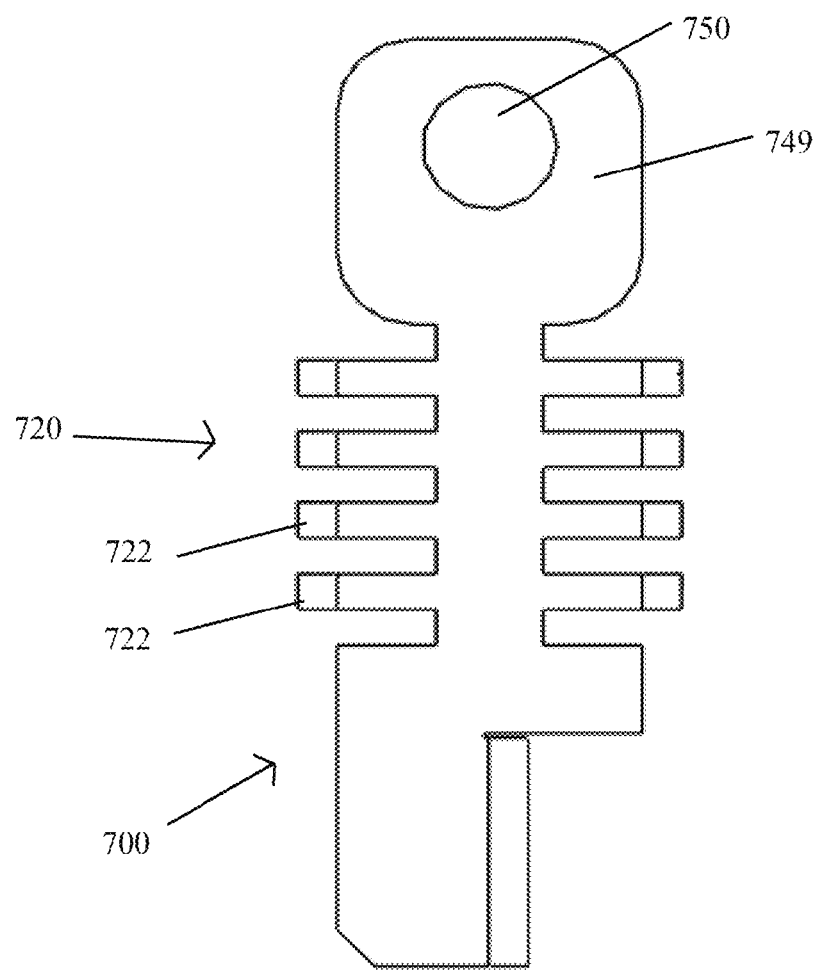
FIG. 3 is a front view of a shunt in accordance with the present invention.
Figure 4:
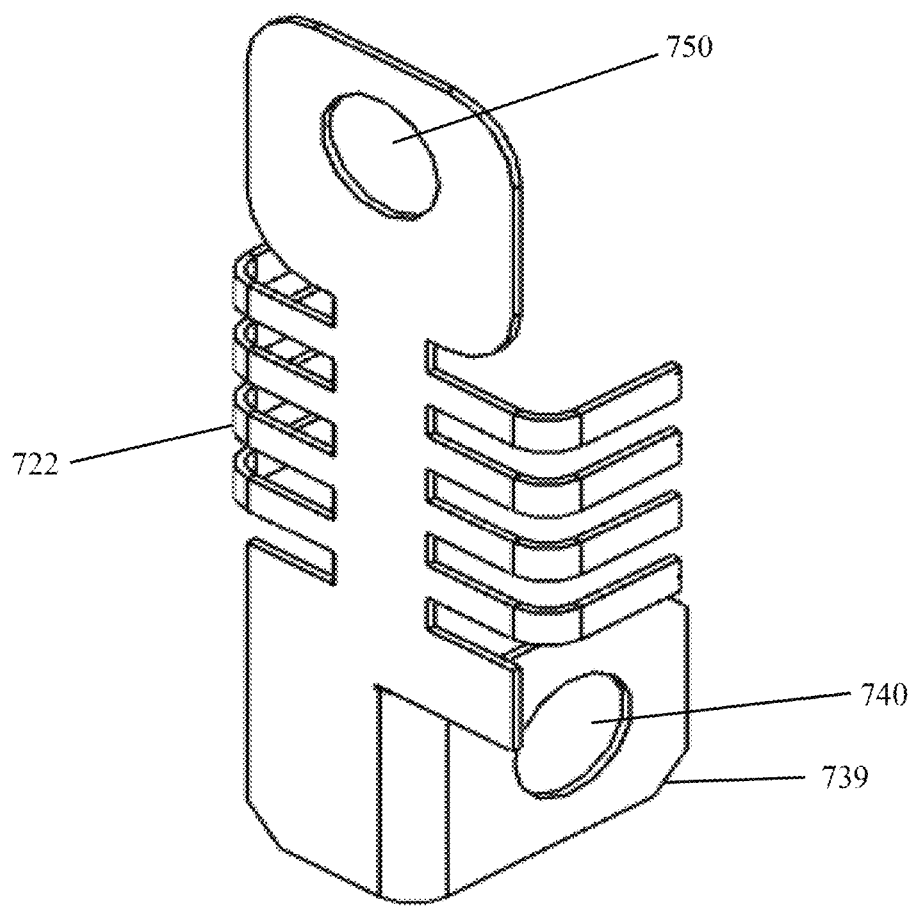
FIG. 4 is a perspective view of the shunt of FIG. 3.
Figure 5:
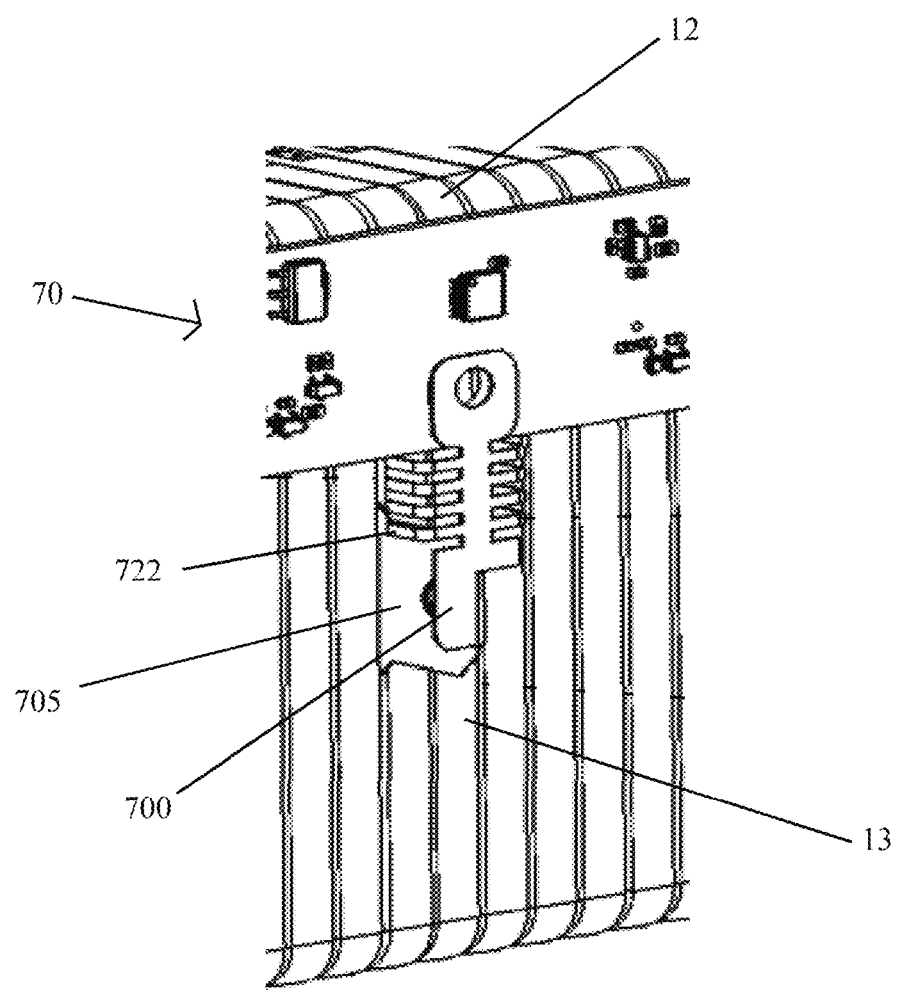
FIG. 5 is a perspective view of the shunt of FIG. 3 connected to the fuel cell system of FIG. 1.

As depicted in FIGS. 3-5, a first shunt 700 may be connectable to shunt control circuitry 50 and the anode or cathode side (e.g. cathode side 577 and anode side 587) of one or more fuel cells (e.g., fuel cell 13) of fuel cell system 10. Shunt 700 may include a mounting member 739 having an opening 740 configured to be connected (e.g., using a bolt, screw or other fastener) to a mounting bracket 705 of fuel cell system 10. Mounting bracket 705 may be connected to or integral with a fuel cell plate, such as a collector plate, to allow an electrical connection between such a fuel cell plate and shunt 700.

Shunt 700 may also include a connecting member 749 having an opening 750 configured to be connected (e.g., using a bolt, screw or other fastener) to a shunt control circuitry (e.g., shunt control circuitry 50), controller (e.g., a controller 70) and/or other control mechanism configured to control a shorting of one or more of fuel cells 13 of fuel cell system 10. Such control mechanism (e.g., controller 70) and shunt 700 may be mounted to, and supported by, an outside surface 12 of fuel cell system 10 or may be mounted to a mounting plate (e.g., a printed circuit card with electronic components thereon) extending out of and/or connected to fuel cell system 10.

A second shunt (not shown) may be identical to shunt 700 (not shown) and may be connected to and mounted to a second mounting bracket (not shown) connected to, or formed as a unitary structure relative to, a second fuel cell plate, such as a collector plate, on an opposite side of MEA 530 relative to shunt 700 to allow an electrical connection between the second shunt and the second fuel cell plate. The second shunt may also be connected to shunt control circuitry (e.g., shunt control circuitry 50), controller (e.g., a controller 70) and/or another control mechanism. The connection between the shunts and the fuel cell plates and the shunts and the shunt control circuitry may allow shunting between opposite sides of such a fuel cell (e.g., fuel cell 13 to occur).

Further, shunt 700 may be connectable to an anode side (e.g., anode side 587) of a fuel cell (e.g., fuel cell 13) while the second shunt may be connectable to a cathode side (e.g., cathode side 577) of the fuel cell. Such current collector plates may be located in a same fuel cell or may be located in separate fuel cells (e.g., of several fuel cells 13) connected in series but having one or more additional fuel cells therebetween. Further the anode and cathode may be located in reversed positions and the connecting members and mounting brackets may be coupled to the anode and cathode sides in such positions.

Shunt 700 may also have a first side 720 including arms 722 configured to allow a dissipation of heat therefrom. The arms may be evenly vertically spaced and horizontally aligned as depicted in the figures or they may be misaligned vertically and/or horizontally. The spacing of the arms from each other vertically may allow any heat generated by electrical current passing therethrough to be dissipated. Shunt 700 may have a volume and surface area to provide a desired amount of resistance for the shunting process described. Further the arm locations and spacing may be sized and dimensioned based on such resistance along with a desired about of heat dissipation away from the shunt and fuel cell during use.

As described above, shunting electrical current between the anode and cathode of a fuel cell (e.g., fuel cell 13), or from a first anodic end of a series of fuel cells (e.g., fuel cell system 10) to an opposite cathodic end, may achieve various benefits including boosting the electrical power output of such a fuel cell and/or fuel cell system.

Shunt control circuitry 50 and/or controller 70 may be mounted to, and supported by, a fuel cell (e.g., fuel cell 13). Shunt circuitry can be controlled by a processor (e.g., controller 70 mounted to the fuel cell as described or the circuitry may be controlled by a processor off board on a main processor (not shown). Shunt control circuitry 50 may include an electrical path 51 which electrically couples anode 52 and cathode 53 of one of the fuel cells 13 together via a shunt, such as shunt 700 mounted to one of fuel cells 13 and outside portion 12 of fuel cell system 10. It should be understood that this shunt control circuitry 50 is present for or otherwise associated with each of the respective fuel cells (e.g., fuel cell 13) as described above. In one form of the invention (not shown) the electrical path comprises, at least in part, an ultracapacitor which temporarily stores electrical energy generated during the shunting period. This energy which would otherwise be wasted, can be recovered by using an ultracapacitor which is placed in the electrical pathway 24.

As indicated above, fuel cell system 10 may include controller 70. The controller may be alternatively referred to hereinafter as controller 70 or shunt controller 70. In one embodiment, all of the shunt control circuitries 50 of the fuel cell system 10 are electrically coupled to a common shunt controller 70. Alternatively, multiple shunt controllers 70 can be employed. A suitable shunt controller (e.g., shunt controller 70) for this application may be a programmable microcontroller chip utilized to perform the program logic as more fully described in U.S. Pat. No. 6,620,538, for example. As noted above, second circuitry 60, which is electrically coupled with the shunt controller 70, is employed for measuring the rate of voltage recovery following shorting, as will be described below, and wherein the rate of voltage recovery is employed, at least in part, to control and/or monitor the operation of the fuel cell 13. In this regard, the second circuitry may include a microprocessor and which may be programmed to provide the electrical output as will be described in greater detail hereinafter. It is possible that functions as provided by the second circuitry 60 may be performed by the shunt controller 70 by means of modifications made to programming logic supplied to same.

Controller 70 may include a pair of voltage sensor electrodes (or a pair of voltage sensors) 71 and 72, respectively, for each of the fuel cells 13, and which are electrically coupled with the anode 52 and cathode 53, respectively, and which individually sense the voltage at the anode and cathode of the fuel cell module 13. Fuel cell system 10 may also include a current sensor 73 for use by the shunt controller 70 in detecting current flow from the fuel cell 13. In one embodiment, the current sensor is in the form of a current shunt that detects current flowing from the fuel cell 13 with a direct electrical connection to the fuel cell 13. In the illustrated embodiment, without a direct electrical connection, the current sensor 73 is a current transformer. Other types of current sensors known in the art could also be employed. In one embodiment, the current sensor 73 and voltage sensors 71 and 72 are separate from the controller 70, although the controller 70 includes circuitry which is used in reading the current and voltage sensors. However, in an alternative embodiment, some or all of the voltage or current sensors are included in the controller 70. Additionally, it will be recognized that the second circuitry 60, in the form of the microprocessor, described above, reads the current and voltage sensors as described, above, in order to calculate the rate of voltage recovery which is useful in the practice of the present invention.

Fuel cell power system 10 may include fuel shut off valves 74 which are disposed in fluid metering relation relative to the supply of source of fuel 40. In this regard, the shunt controller 70 is electrically coupled in controlling relation relative to the respective valves 74. In yet a further embodiment of the present invention, the fuel cell power system 10 further includes a temperature sensor 75 for sensing the temperature of one or more of the fuel cells 13. For example, one or more temperature sensors can be provided for each fuel cell 13 and coupled by an electrical conduit to the shunt controller 70; or in the alternative, a temperature sensor can be provided for groups of fuel cells (e.g., groups of fuel cell 13) in various locations (within the housing 11) of fuel cell system 10.

As described in co-owned U.S. Pat. Nos. 7,722,972 and 6,992,129, which are incorporated herein by reference, first shunting circuitry 50, controller 70 and other disclosed components may cause shorting of anode 52 to cathode 53 according to various shunting duty cycles and frequencies. Such shorting may be performed via such shunting circuitry 50, and/or controller 70 being connected to appropriate portions of fuel cell 13 and/or fuel cell system 10 utilizing shunt 70 mounted to, and supported by, fuel cell 13 and/or fuel cell system 10.

As described in co-owned U.S. Pat. No. 7,722,972 and depicted in FIG. 1, it should be understood that the rate of voltage recovery, as calculated by the second circuitry 60 is predictive of the operational hydration of fuel cell 13. Controller 70 may selectively electrically short the anode to the cathode based, at least in part, upon the operational hydration of the fuel cell 13 as predicted, at least in part, by the rate of voltage recovery as provided by the second circuitry 60. The duty cycle and frequency may be adjusted, at least in part, by the controller in response to the operational hydration of the fuel cell as provided by the second circuitry 60. Controller 70 may be operable to decrease the frequency of the electrical shorting of the anode 52 of the fuel cell, to the cathode 53 thereof, if the operational hydration of the fuel cell exceeds a predetermined threshold. Still further, if the operational hydration of the fuel cell exceeds a predetermined threshold the duration of the electrical shorting of the anode of the fuel cell to the cathode may also be further decreased. In the alternative, the frequency of the periodic shorting may be increased when the fuel cell is operationally dehydrated, as is discussed in greater detail in the indicated patent.

As understood from the discussion above, each fuel cell 13 produces electrical power having a given current and voltage output which is provided to a load, such as an industrial vehicle or forklift truck, battery charger, cell tower backup power supply, over-road vehicle or any other electrical load. Controller 70 is electrically coupled with one or more instance of fuel cell 13 via a shunt (e.g., shunt 700), and is operable to shunt the electrical current between anode 52, and cathode 53 thereof, under predetermined operational conditions. In further examples disclosed in U.S. Pat. No. 7,722,972, controller 70 upon sensing, by way of the voltage and current sensors 71, 72 and 73, a given voltage, and current output of the fuel cell 13, may further adjust valve 74 associated with that fuel cell into a predetermined fluid metering relation relative to the supply of fuel 40.

Figure 6:
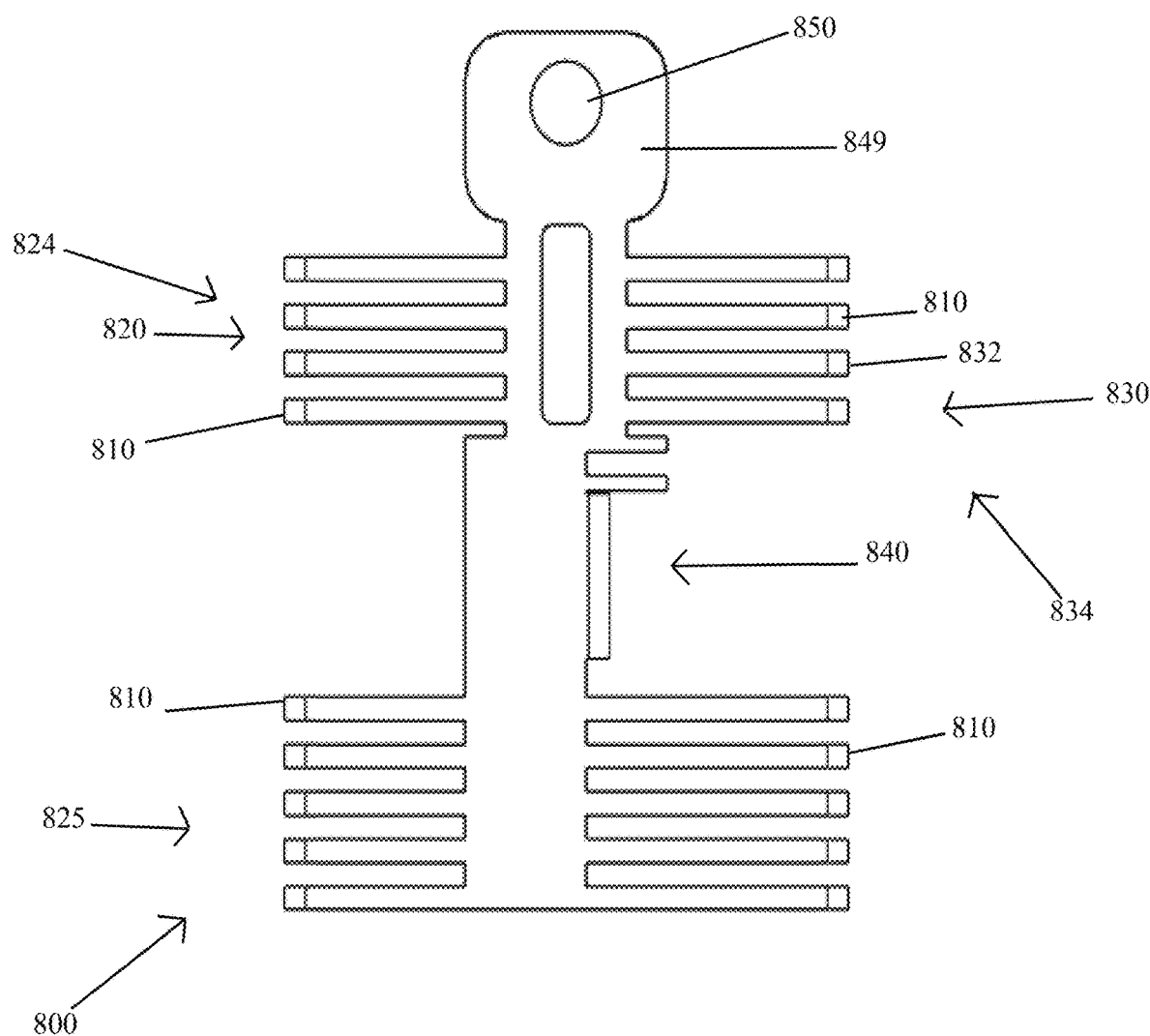
FIG. 6 is a front view of a shunt in accordance with the present invention.
Figure 7:
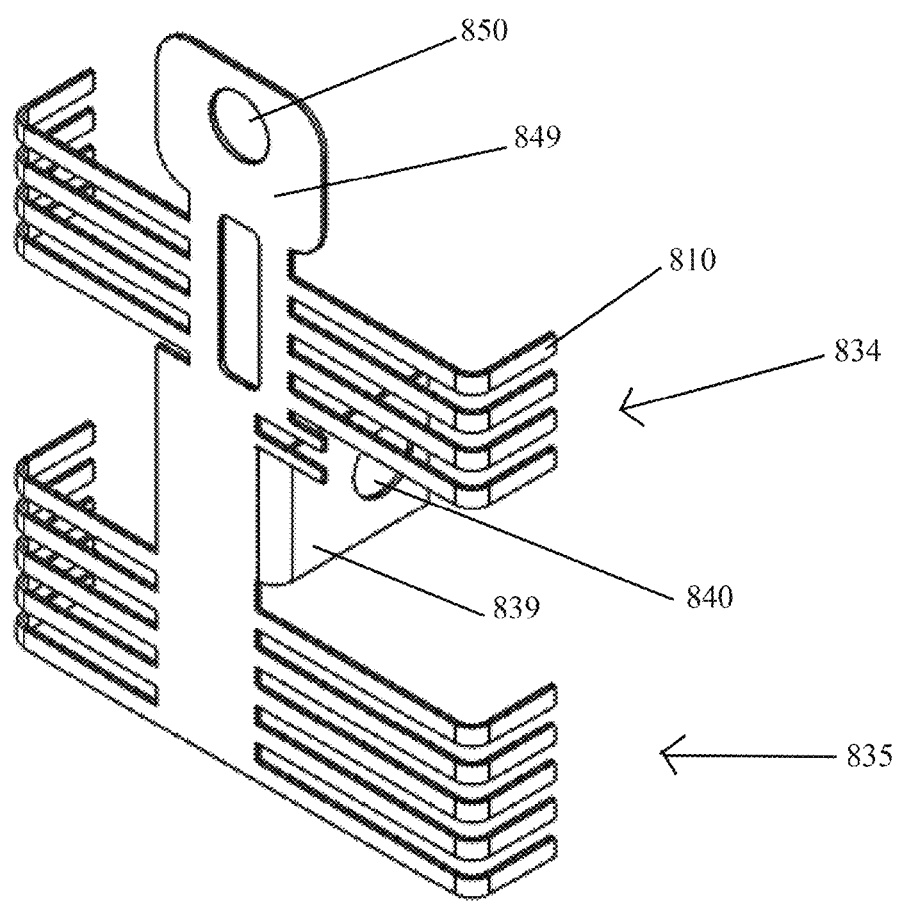
FIG. 7 is a perspective view of the shunt of FIG. 6.
Figure 8:
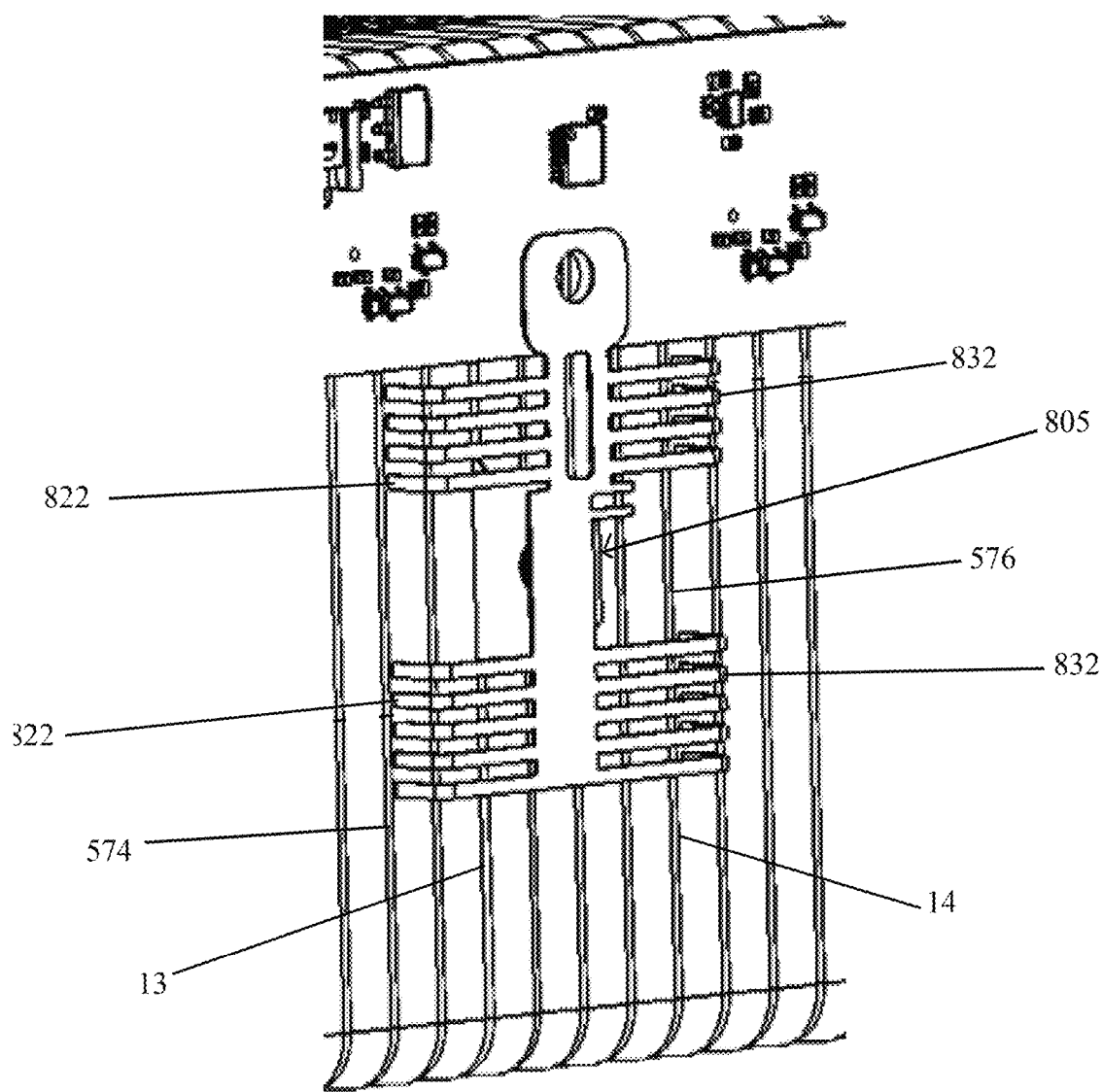
FIG. 8 is a perspective view of the shunt of FIG. 6 connected to the fuel cell system of FIG. 1.

In an example, FIGS. 6-8 depict a shunt 800 connectable to shunt control circuitry 50 and the anode and cathode sides (e.g., cathode side 577 and anode side 587) of one or more fuel cells (e.g., fuel cell 13) of fuel cell system 10, as described above for first shunt 700. Shunt 800 may include multiple arms 810 for dissipating heat from shunt 800. A first side 820 may include arms 822 while a second side 830 may include arms 832. Arms 822 may include upper arms 824 and lower arms 825 while arms 832 may include upper arms 834 and lower arms 835. Each set of upper arms may be spaced from the corresponding lower arms in a vertical direction as depicted. Shunt 800 may have a volume and surface area to provide a desired amount of resistance for the shunting process described. Further the arm locations and spacing may be sized and dimensioned based on such resistance along with a desired about of heat dissipation away from the shunt and fuel cell during use.

Shunt 800 may include a mounting member 839 having an opening 840 located vertically relative to the figures between upper arms (i.e., upper arms 824, upper arms 834) the lower arms (i.e., lower arms 825 and lower arms 835) and configured to be connected (e.g., using a bolt, screw or other fastener) to a mounting bracket 805 of fuel cell system 10. Mounting bracket 805 may be connected to, or formed monolithically relative to, a fuel cell plate, such as a collector plate, to allow an electrical connection between such a fuel cell plate and shunt 800.

Shunt 800 may also include a connecting member 849 having an opening 850 configured to be connected (e.g., using a bolt, screw or other fastener) to shunt control circuitry (e.g., shunt control circuitry 50), controller (e.g., controller 70) and/or another control mechanism configured to control a shorting of one or more instance of fuel cell 13 of fuel cell system 10. Such control mechanism (e.g., controller 70) and shunt 800 may be mounted to, and supported by, outside surface 12 of fuel cell system 10 or may be mounted to a mounting plate (e.g., a printed circuit card with electronic components thereon) extending out of and/or connected to fuel cell system 10.

Similar to shunt 700 described above, a second shunt (not shown) may be identical to shunt 800 (not shown) and may be connected to and mounted to a second mounting bracket (not shown) connected to, or formed monolithically relative to, a second fuel cell plate, such as a collector plate, on an opposite side of MEA 530 relative to shunt 800 to allow an electrical connection between the second shunt and the second fuel cell plate. The second shunt may also be connected to shunt control circuitry (e.g., shunt control circuitry 50), controller (e.g., a controller 70) and/or another control mechanism. The connection between the shunts and the fuel cell plates and the shunts and the shunt control circuitry may allow shunting between opposite sides of such a fuel cell (e.g., fuel cell 13 to occur). Such current collector plates on the opposite sides of the MEA may be located in a same fuel cell or may be located in separate fuel cells (e.g., several of fuel cell 13) connected in series but having one or more additional fuel cells therebetween.

As indicated, shunt 800 and a second instance of such a shunt may be connectable to collector plates (e.g., collector plates 570) or other conductive portions on opposite sides of one or more membrane electrode assemblies of one or more fuel cells (e.g., fuel cell 13). Shunt 800 may be connectable to an anode side (e.g. anode side 587) of a fuel cell (e.g., fuel cell 13) and the second shunt may be connectable to a cathode side (e.g., cathode side 577) of the fuel cell. Further, the anode and cathode may be located in reversed positions and the shunts may be coupled to the anode and cathode sides in such positions.

Figure 9:
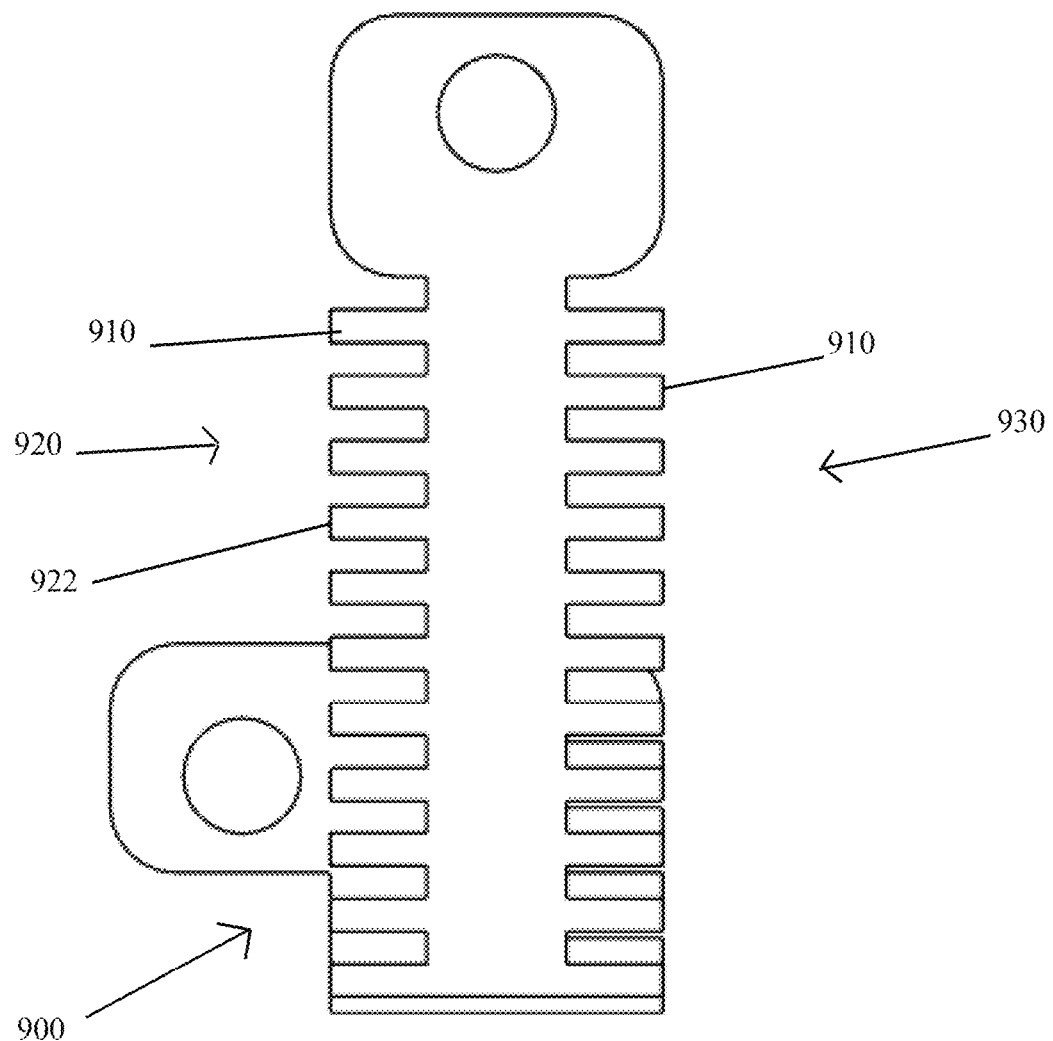
FIG. 9 is a front view of a shunt in accordance with the present invention.
Figure 10:
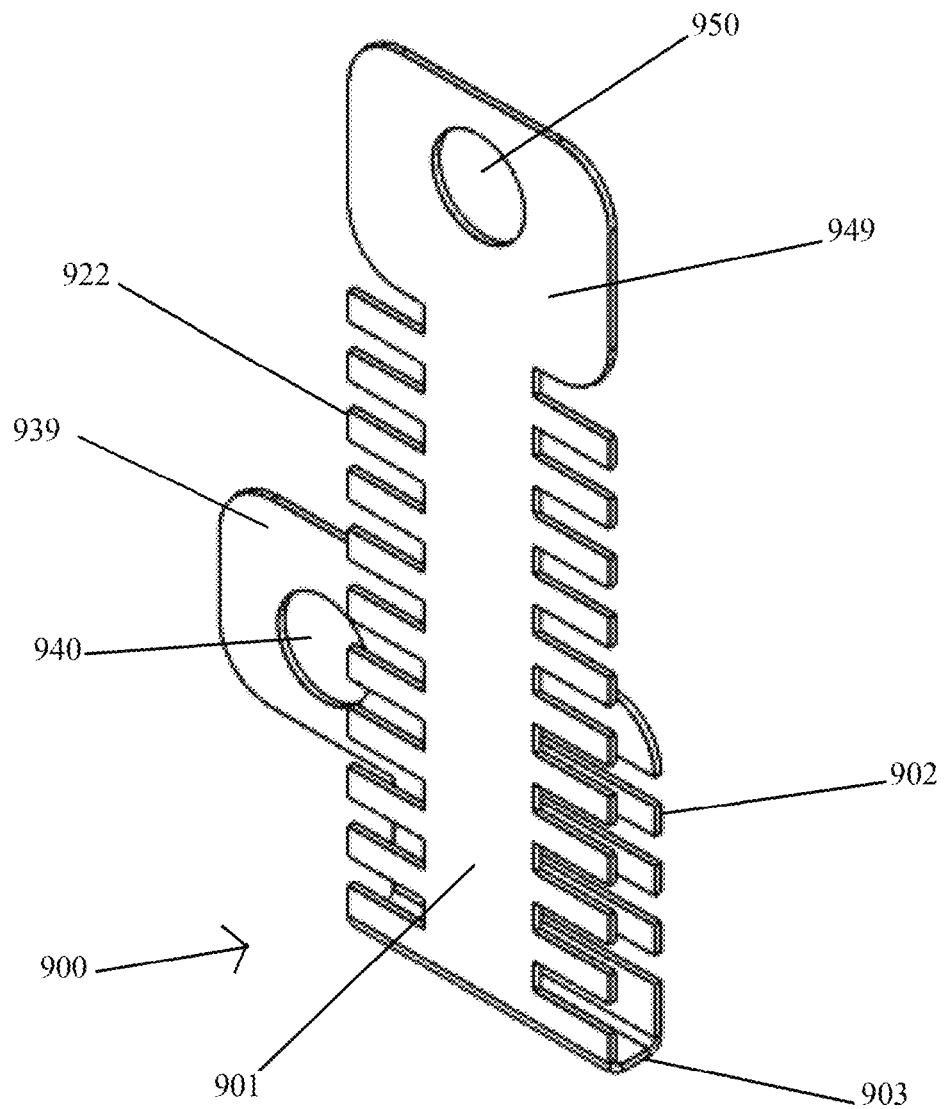
FIG. 10 is a perspective view of the shunt of FIG. 9.
Figure 11:
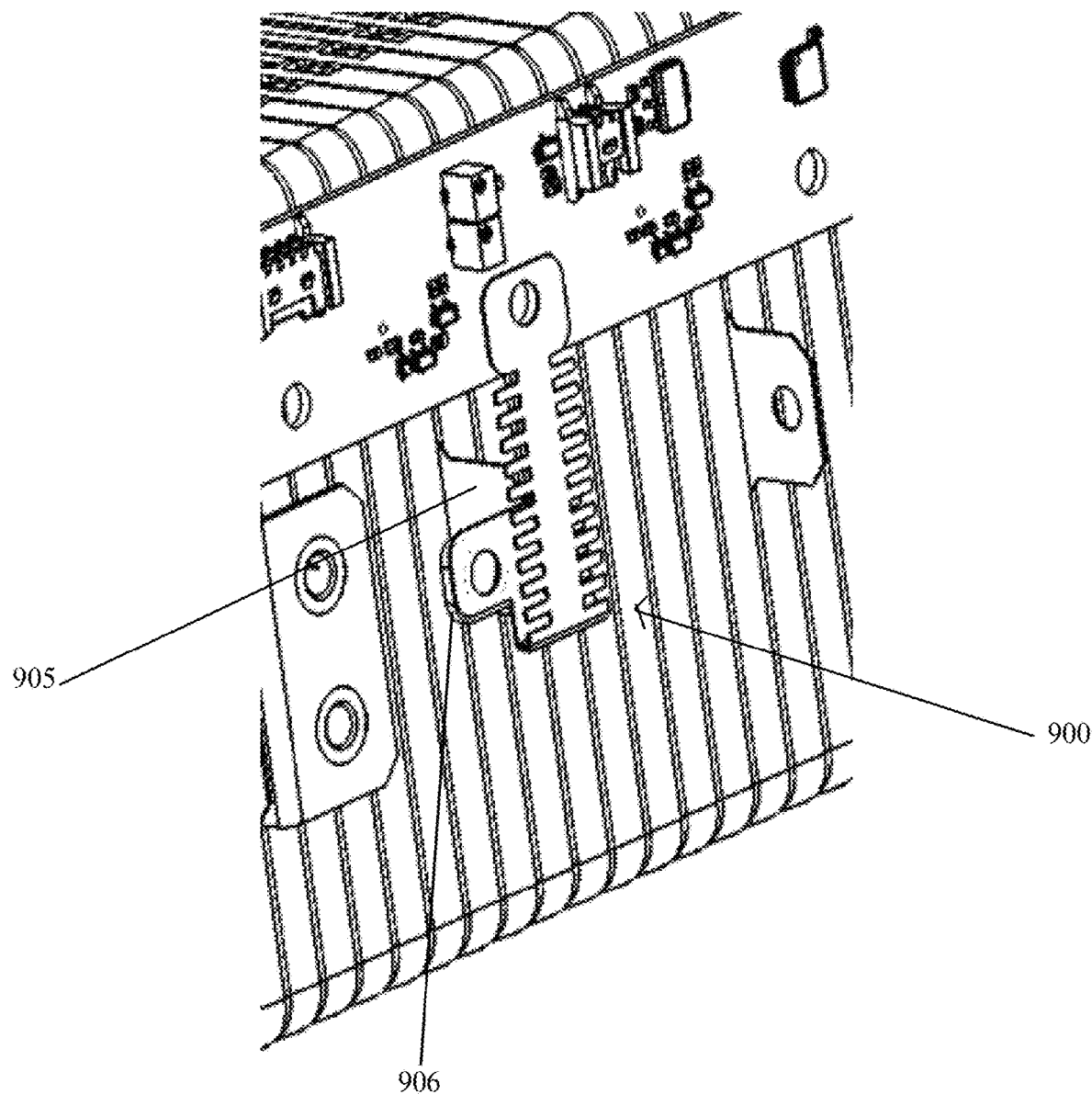
FIG. 11 is a perspective view of the shunt of FIG. 9 connected to the fuel cell system of FIG. 1.

In another example depicted in FIGS. 9-11, a shunt 900 may be connectable to shunt control circuitry 50 and an anode or cathode side (e.g., cathode side 577 and anode side 587) of a fuel cell (e.g., fuel cell 13) of fuel cell system 10, as described above for first shunt 700 and shunt 800. Shunt 900 may include a mounting member 939 connectable to a collector plate (e.g., collector plates 570) or other conductive portion on a side of one or more membrane electrode assemblies.

A first side 920 may include arms 922 to dissipate heat when current flows through shunt 900. Shunt 900 may include a front portion 901 spaced from a rear portion 902 and connected by a bottom portion 903. Arms 910 may be located on the front portion and the rear portion.

Mounting member 939 may have an opening 940 located on rear portion 902 and extending about perpendicularly relative to a longitudinal dimension (i.e., vertical dimension as depicted) of shunt 900 and configured to be connected (e.g., using a bolt, screw or other fastener) to a mounting bracket 905 of fuel cell system 10. Mounting member 939 may be configured to be connected (e.g., using a bolt, screw or other fastener) to a mounting bracket 905 of fuel cell system 10. Mounting bracket 905 may be connected to, or formed monolithically relative to, a fuel cell plate, such as a collector plate, to allow an electrical connection between such a fuel cell plate and shunt 900.

As depicted, a connecting portion 906 of mounting bracket 905 may have a longitudinal dimension aligned about parallel to a longitudinal dimension of fuel cell system 10 and about perpendicular relative to a longitudinal dimension of shunt 900 to allow mounting bracket 905 and mounting member 939 to be connected such that mounting bracket 905 connected to fuel cell 10 may support a weight of shunt 900. Mounting member 939 may also be extend at a different angle relative to the longitudinal dimension of shunt 900 to engage to engage a mounting bracket. (connecting point will reversible between stack and PCB based on design and orientation of the shunt and PCB)

Front portion 901 may be separated from rear portion by a width of bottom 903 with such separation allowing air flow therethrough to promote cooling of shunt 900 when electrically connected to anode and cathode portions of one or more fuel cells of fuel cell system 10.

Shunt 900 may also include a connecting member 949 having an opening 950 configured to be connected (e.g., using a bolt, screw or other fastener) to a shunt control circuitry (e.g., shunt control circuitry 50), controller (e.g., a controller 70) and/or other control mechanism configured to control a shorting of one or more of fuel cells 13 of fuel cell system 10. Such control mechanism (e.g., controller 70) and shunt 900 may be mounted to, and supported by, outside surface 12 of fuel cell system 10 or may be mounted to a mounting plate (e.g., a printed circuit card with electronic components thereon) extending out of and/or connected to fuel cell system 10.

A second shunt (not shown) may be identical to shunt 900 and may be connected to and mounted to a second mounting bracket (not shown) connected to or integral with a second fuel cell plate, such as a collector plate, on an opposite side of MEA 530 relative to shunt 900 to allow an electrical connection between the second shunt and the second fuel cell plate. The second shunt may also be connected to shunt control circuitry (e.g., shunt control circuitry 50), controller (e.g., a controller 70) and/or another control mechanism. The connection between the shunts and the fuel cell plates and the shunts and the shunt control circuitry may allow shunting between opposite sides of such a fuel cell (e.g., fuel cell 13 to occur). Such current collector plates may be located in a same fuel cell or may be located in separate fuel cells (e.g., of several fuel cells 13) connected in series but having one or more additional fuel cells therebetween.

As indicated, shunt 900 and a second instance of such a shunt may be connectable to collector plates (e.g., collector plates 570) or other conductive portions on opposite sides of one or more membrane electrode assemblies of one or more fuel cells (e.g., fuel cell 13). Shunt 900 may be connectable to an anode side (e.g. anode side 587) of a fuel cell (e.g., fuel cell 13) and the second shunt may be connectable to a cathode side (e.g., cathode side 577) of the fuel cell. Further the anode and cathode may be located in reversed positions and the shunts may be coupled to the anode and cathode sides in such positions. Shunt 900 may have a volume and surface area to provide a desired amount of resistance for the shunting process described. Further the arm locations and spacing may be sized and dimensioned based on such resistance along with a desired about of heat dissipation away from the shunt and fuel cell during use.

Figure 12:
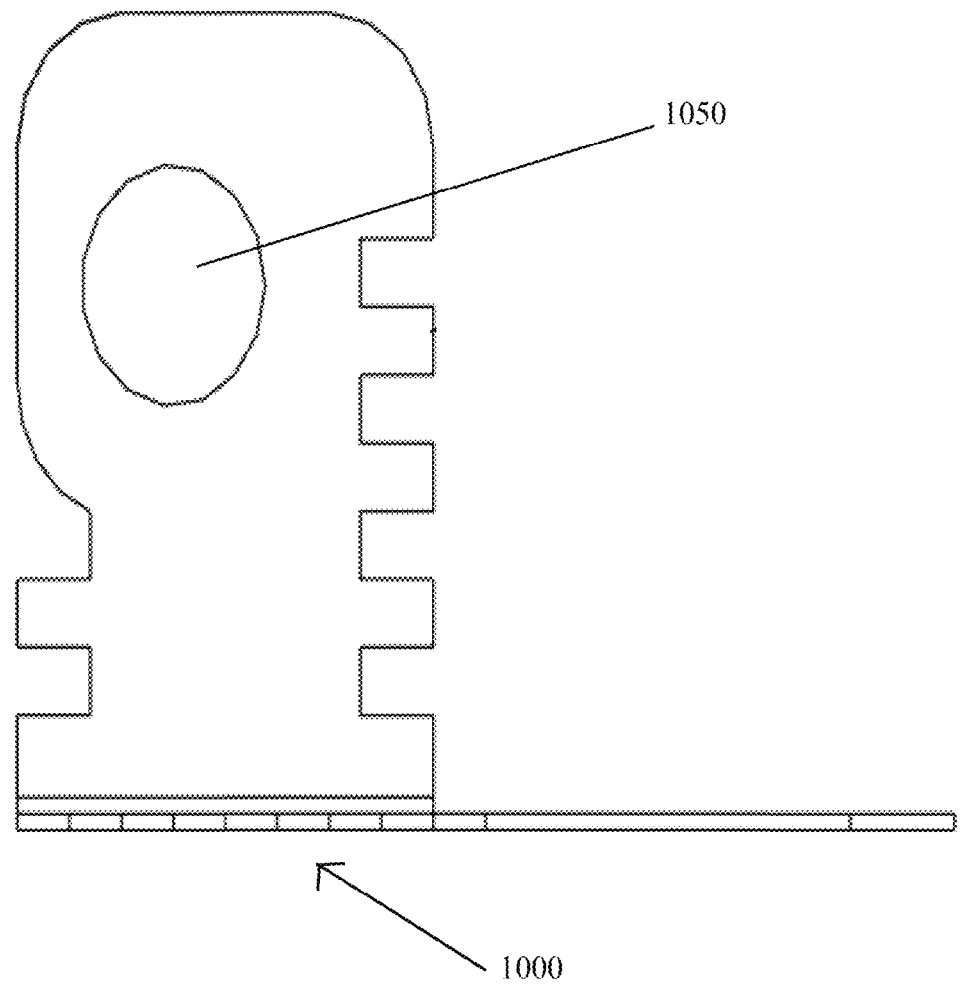
FIG. 12 is a front view of a shunt in accordance with the present invention.
Figure 13:
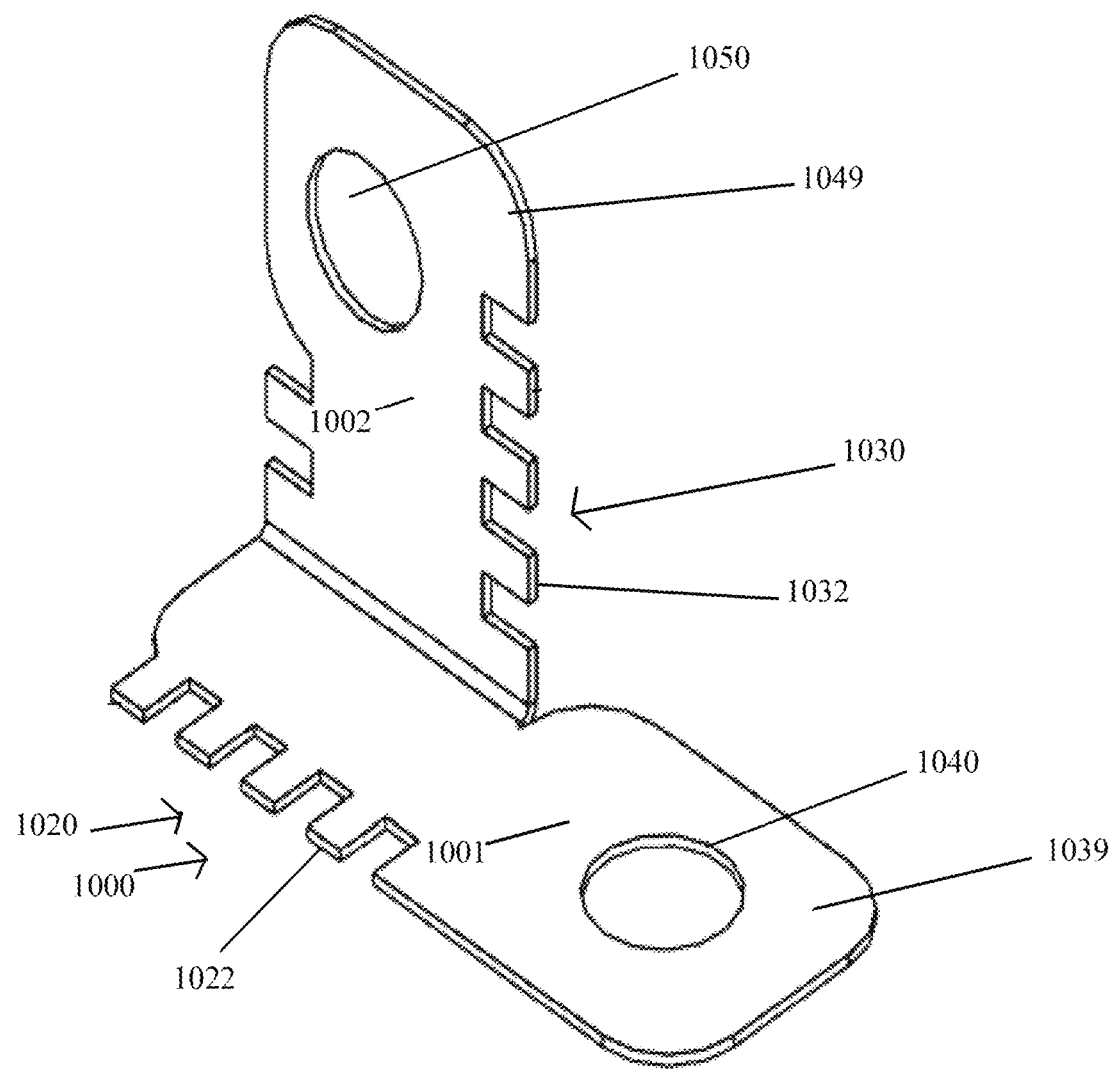
FIG. 13 is a perspective view of the shunt of FIG. 12.
Figure 14:
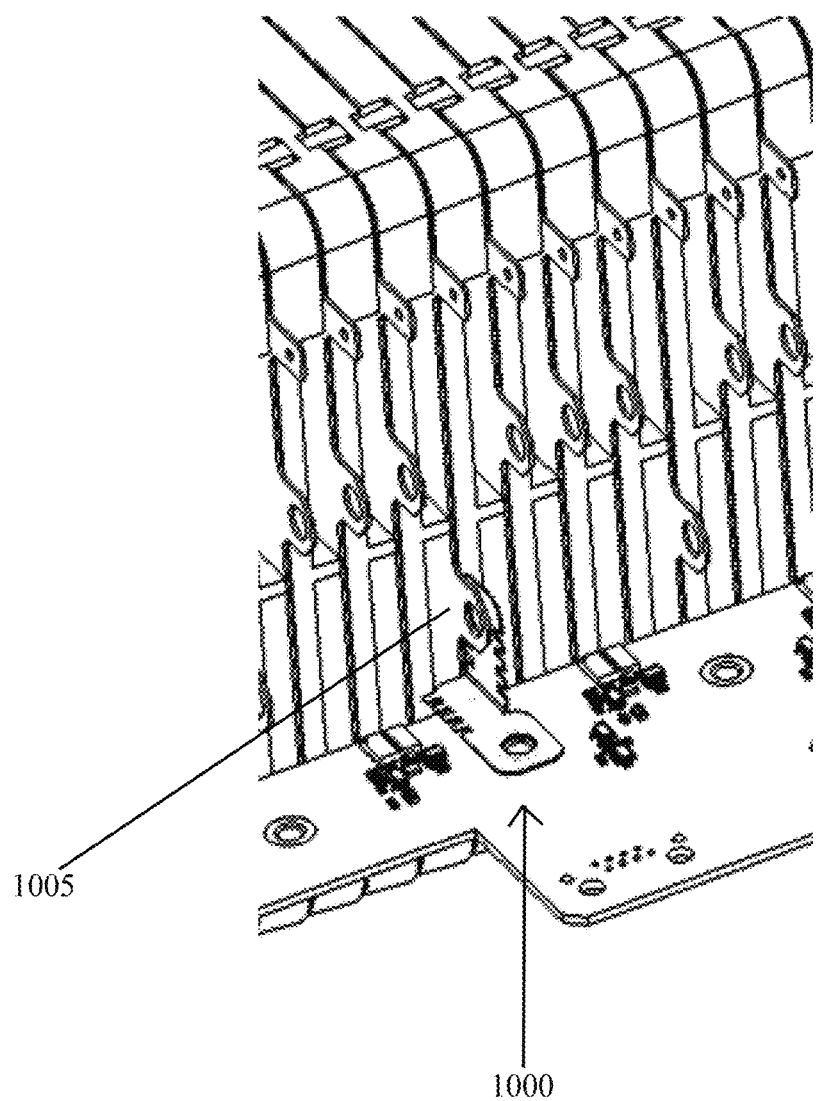
FIG. 14 is a perspective view of the shunt of FIG. 12 connected to the fuel cell system of FIG. 1.

In another example depicted in FIGS. 12-14, a shunt 1000 may be connectable to shunt control circuitry 50 and an anode or cathode side (e.g., cathode side 577 or anode side 587) of a fuel cell (e.g., fuel cell 13) of fuel cell system 10, as described above for first shunt 700, shunt 800, and shunt 900.

Shunt 1000 may include a bottom portion 1001 having a longitudinal dimension aligned about perpendicularly relative to a longitudinal dimension of an upper portion 1002. A first side 1020 on bottom portion 1001 may include arms 1022 while a second side 1030 on upper portion 1002 may include arms 1032 with such arms 1022 and arms 1032 configured to dissipate heat when current flows through shunt 9000.

Shunt 1000 may include a mounting member 1049 having an opening 1050 located on upper portion 1002 configured to be connected (e.g., using a bolt, screw or other fastener) to a mounting bracket 1005 of fuel cell system 10 to allow an electrical connection between such a fuel cell plate and shunt 1000. Mounting bracket 1005 may extend from a portion (e.g., a current collector plate or other plate) of a fuel cell (e.g., fuel cell 13) and may be electrically connected to the fuel cell. Mounting bracket 905 may be connected to, or formed monolithically relative to, a fuel cell plate, such as a collector plate, for example.

Shunt 1000 may also include a connecting member 1039 having an opening 1040 configured to be connected (e.g., using a bolt, screw or other fastener) to a shunt control circuitry (e.g., control circuitry 50), controller (e.g., a controller 70) and/or other control mechanism configured to control a shorting of one or more of fuel cells 13 of fuel cell system 10. Such control mechanism (e.g., controller 70) and shunt 1000 may be mounted to, and supported by, outside surface 12 of fuel cell system 10 or may be mounted to a mounting plate (e.g., a printed circuit card with electronic components thereon) extending out of and/or connected to fuel cell system 10.

A second shunt (not shown) may be identical to shunt 1000 and may be connected to and mounted to a second mounting bracket (not shown) connected to, or formed monolithically relative to, a second fuel cell plate, such as a collector plate, on an opposite side of MEA 530 relative to shunt 1000 to allow an electrical connection between the second shunt and the second fuel cell plate. The second shunt may also be connected to shunt control circuitry (e.g., shunt control circuitry 50), controller (e.g., a controller 70) and/or another control mechanism. The connection between the shunts and the fuel cell plates and the shunts and the shunt control circuitry may allow shunting between opposite sides of such a fuel cell (e.g., fuel cell 13 to occur). Such current collector plates may be located in a same fuel cell or may be located in separate fuel cells (e.g., of several fuel cells 13) connected in series but having one or more additional fuel cells therebetween.

As indicated, shunt 1000 and a second instance of such a shunt may be connectable to collector plates (e.g., collector plates 570) or other conductive portions on opposite sides of one or more membrane electrode assemblies of one or more fuel cells (e.g., fuel cell 13). Shunt 1000 may be connectable to an anode side (e.g. anode side 587) of a fuel cell (e.g., fuel cell 13) and the second shunt may be connectable to a cathode side (e.g., cathode side 577) of the fuel cell. Further the anode and cathode may be located in reversed positions and the shunts may be coupled to the anode and cathode sides in such positions.

Figure 15:
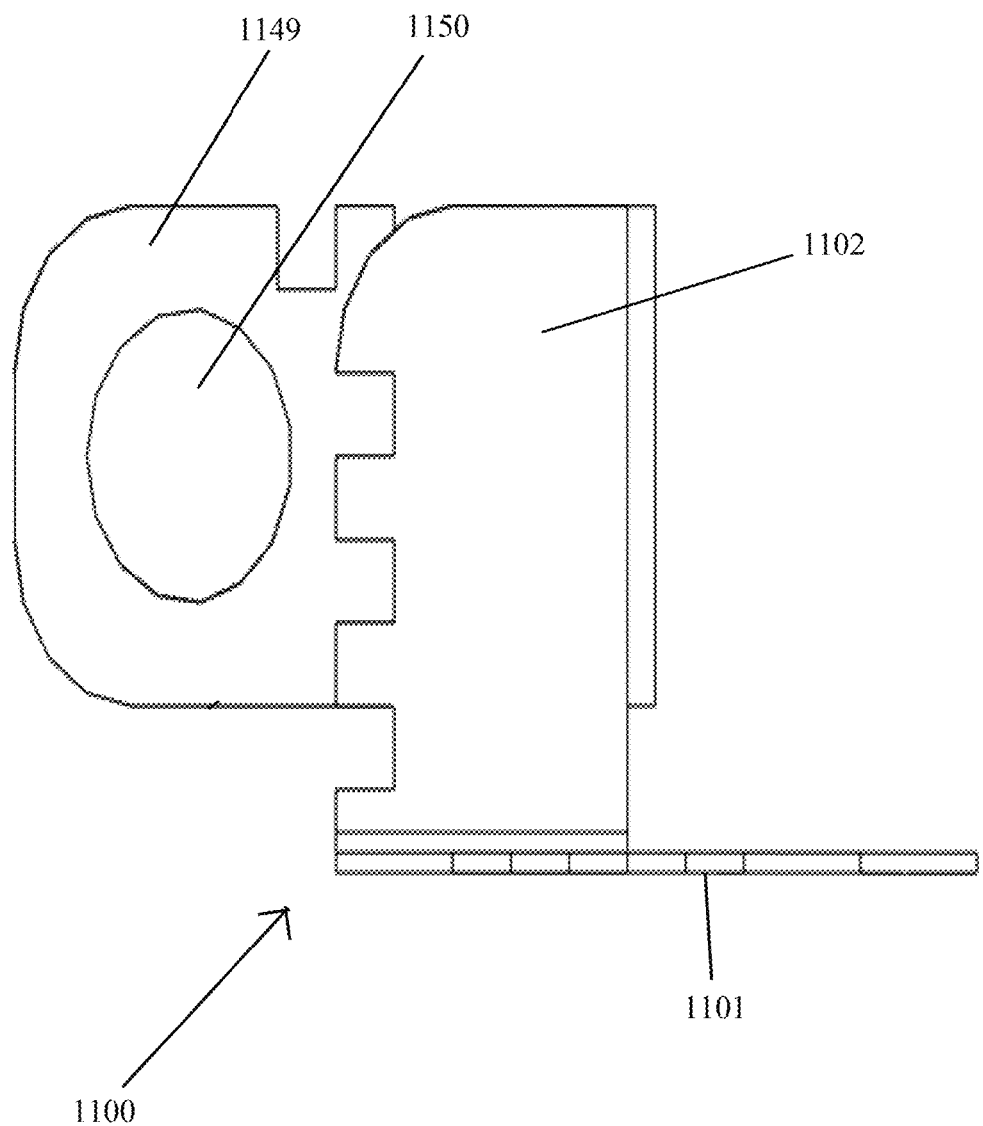
FIG. 15 is a front view of a shunt in accordance with the present invention.
Figure 16:
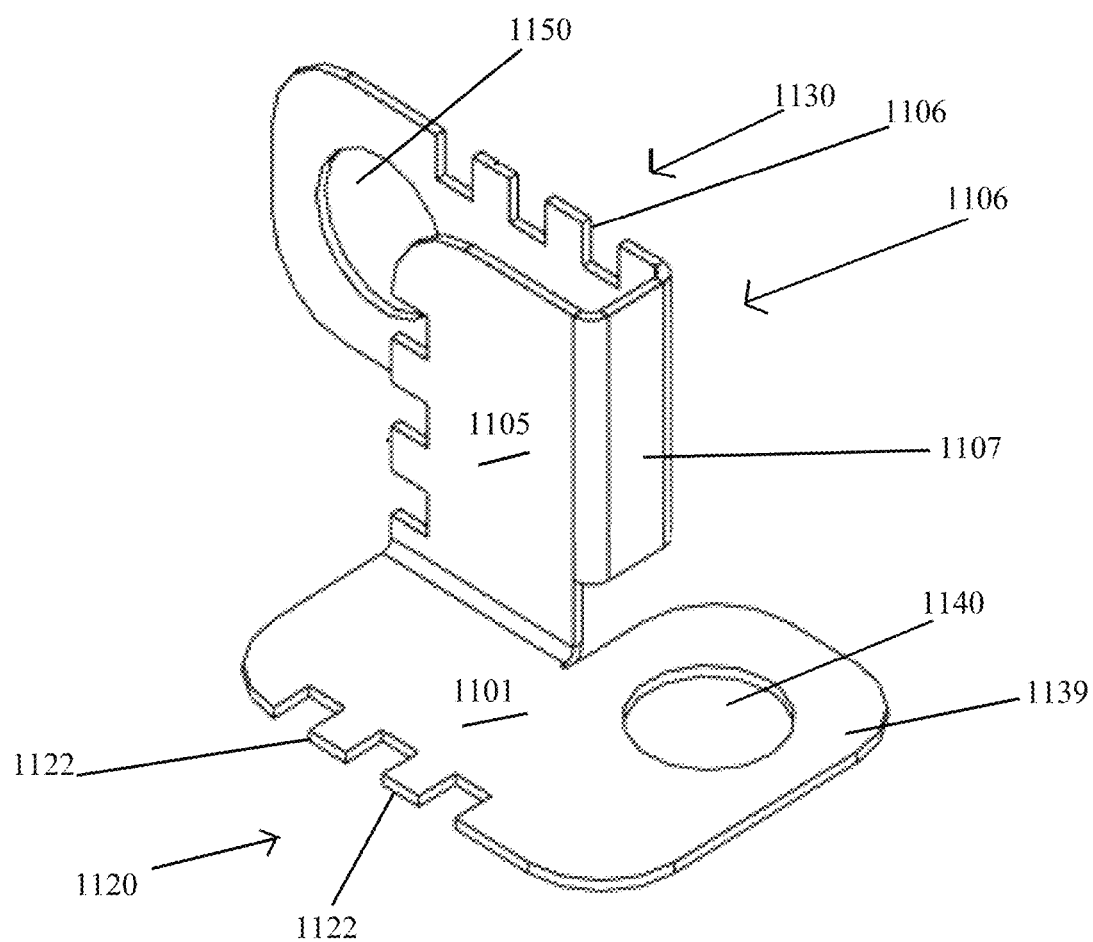
FIG. 16 is a perspective view of the shunt of FIG. 15.
Figure 17:
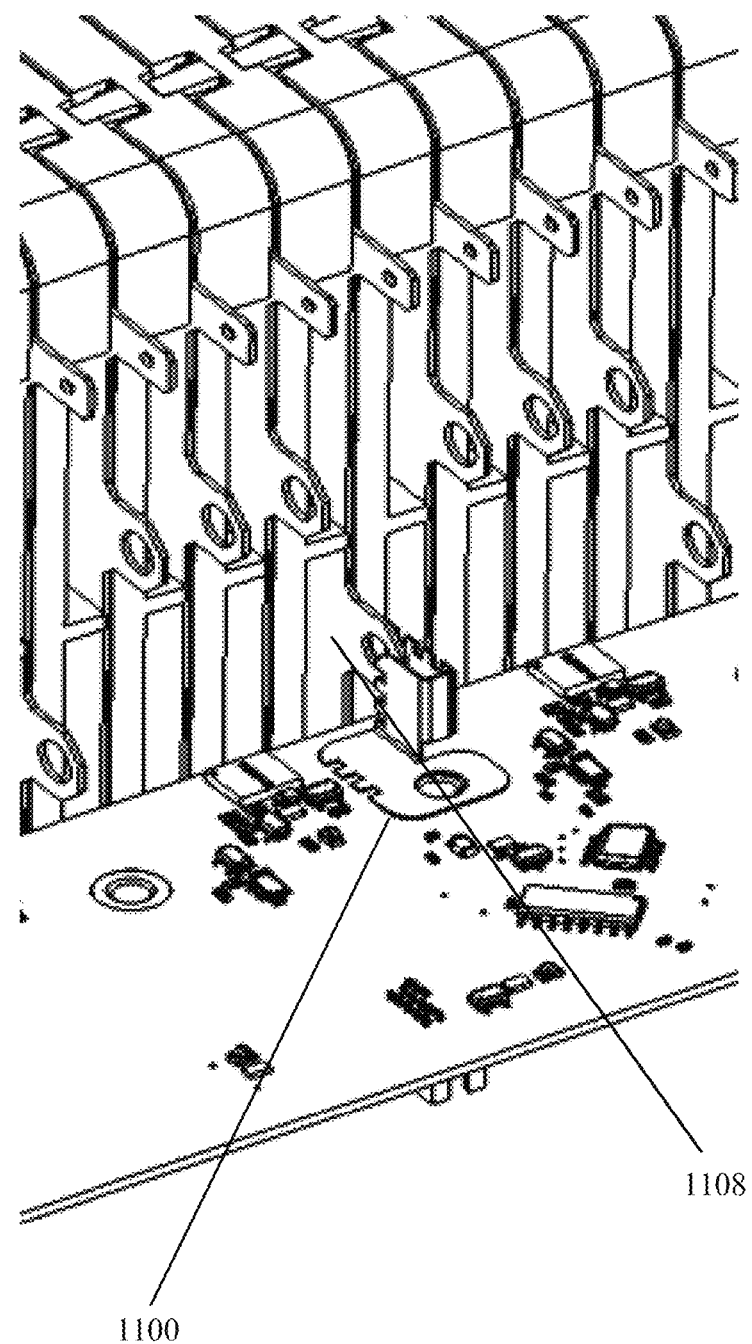
FIG. 17 is a perspective view of the shunt of FIG. 15 connected to the fuel cell system of FIG. 1.

In another example depicted in FIGS. 15-17, a shunt 1100 may be connectable to shunt control circuitry 50 and an anode or cathode side (e.g., cathode side 577 and anode side 587) of a fuel cell (e.g., fuel cell 13) of fuel cell system 10, as described above for first shunt 700, shunt 800, shunt 900, and shunt 1000. Shunt 1100 may include a bottom portion 1101 having a longitudinal dimension aligned about perpendicularly relative to a longitudinal dimension (aligned vertically in FIG. 15) of an upper portion 1102.

A first side 1120 on bottom portion 1101 may include arms 1122 configured to dissipate heat when current flows through shunt 9000. Upper portion 1102 may include a first portion 1105 connected to a second portion 1106 by a connecting portion 1107. First portion 1105 and second portion 1106 may extend upwardly about a same distance upwardly away from bottom portion 1101, and first portion 1105 and second portion 1106 may be spaced from each other by a distance of connecting portion 1107 for an entire such upward extension. Shunt 1100 may include a mounting member 1149 on second portion 1106 having an opening 1150 configured to be connected (e.g., using a bolt, screw or other fastener) to a mounting bracket 1105 of fuel cell system 10. Mounting bracket 1108 may extend from a portion (e.g., a current collector plate or other plate) of a fuel cell (e.g., fuel cell 13) and may be electrically connected to fuel cell 10 to allow an electrical connection between such a portion of a fuel cell (e.g., a fuel cell plate) and shunt 1100. Mounting bracket 1105 may be connected to, or formed monolithically relative to, a fuel cell plate, such as a conductive collector plate, for example.

Lower portion 1101 of shunt 1100 may also include a connecting member 1139 having an opening 1140 configured to be connected (e.g., using a bolt, screw or other fastener) to a shunt control circuitry (e.g., control circuitry 50), controller (e.g., a controller 70) and/or other control mechanism configured to control a shorting of one or more of fuel cells 13 of fuel cell system 10. Such control mechanism (e.g., controller 70) and shunt 1100 may be mounted to, and supported by, outside surface 12 of fuel cell system 10 or may be mounted to a mounting plate (e.g., a printed circuit card with electronic components thereon) extending out of and/or connected to fuel cell system 10.

A second shunt (not shown) may be identical to shunt 1100 and may be connected to, and supported by, a second mounting bracket (not shown) connected to, or formed monolithically relative to, a second fuel cell plate, such as a collector plate, on an opposite side of MEA 530 relative to shunt 1100 to allow an electrical connection between the second shunt and the second fuel cell plate. The second shunt may also be connected to shunt control circuitry (e.g., shunt control circuitry 50), controller (e.g., a controller 70) and/or another control mechanism. The connection between the shunts and the fuel cell plates and the shunts and the shunt control circuitry may allow shunting between opposite sides of such a fuel cell (e.g., fuel cell 13 to occur). Such current collector plates may be located in a same fuel cell or may be located in separate fuel cells (e.g., of several fuel cells 13) connected in series but having one or more additional fuel cells therebetween.

As indicated, shunt 1100 and a second instance of such a shunt may be connectable to collector plates (e.g., collector plates 570) or other conductive portions on opposite sides of one or more membrane electrode assemblies of one or more fuel cells (e.g., fuel cell 13). Shunt 1100 may be connectable to an anode side (e.g. anode side 587) of a fuel cell (e.g., fuel cell 13) and the second shunt may be connectable to a cathode side (e.g., cathode side 577) of the fuel cell. Further the anode and cathode may be located in reversed positions and the shunts may be coupled to the anode and cathode sides in such positions.

Figure 18:
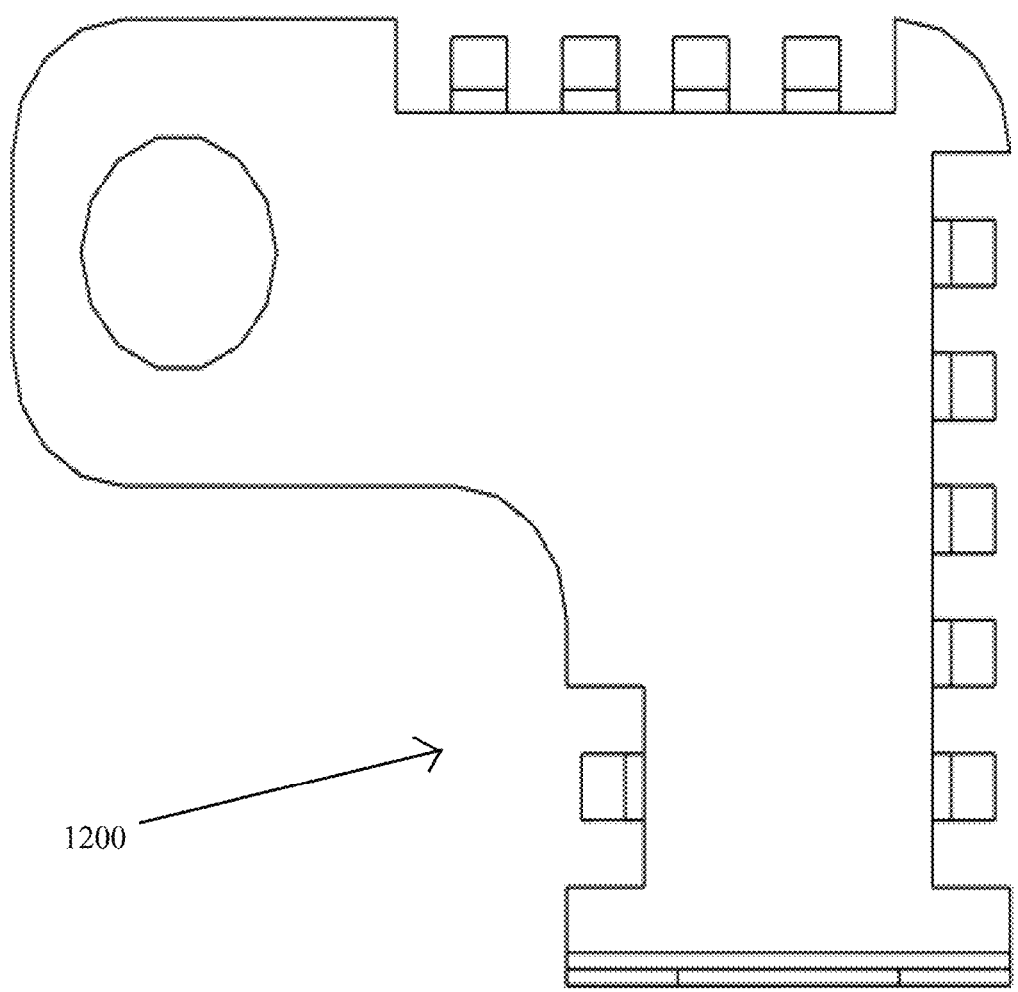
FIG. 18 is a front view of a shunt in accordance with the present invention.
Figure 19:
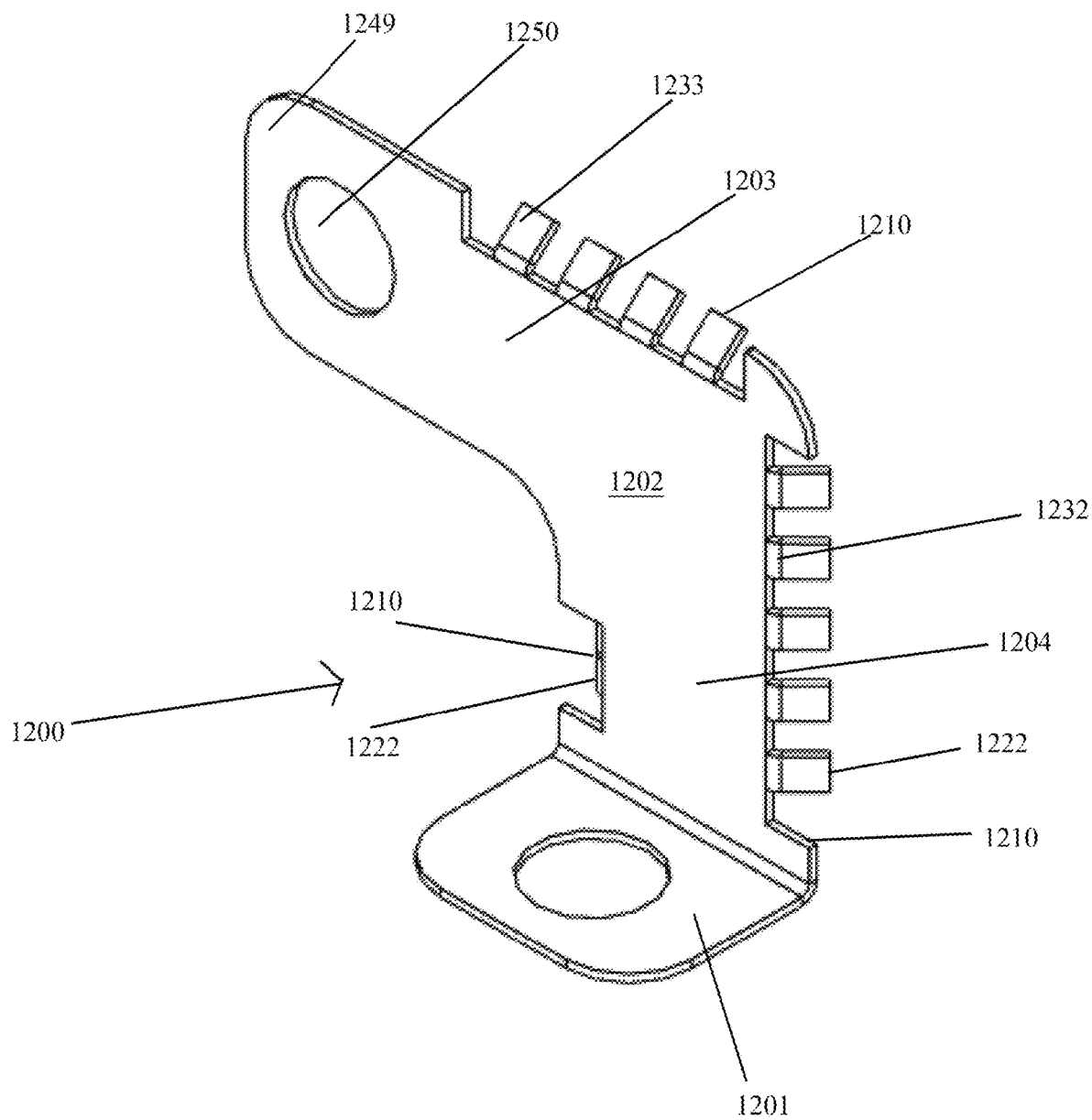
FIG. 19 is a perspective view of the shunt of FIG. 18.
Figure 20:
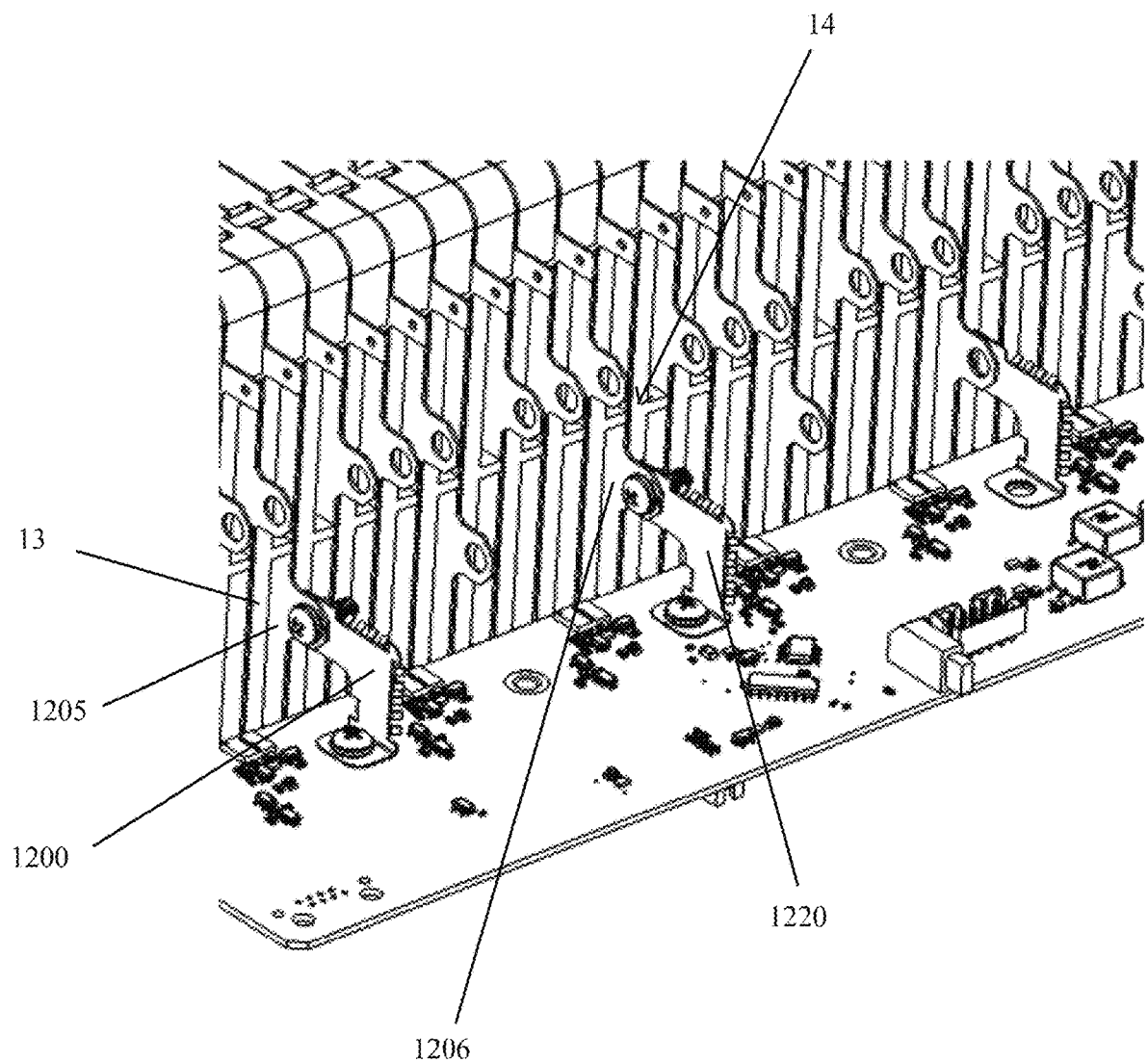
FIG. 20 is a perspective view of the shunt of FIG. 18 connected to the fuel cell system of FIG. 1.

In another example depicted in FIGS. 18-20, a shunt 1200 may be connectable to shunt control circuitry 50 and an anode or cathode side (e.g., cathode side 577 or anode side 587) of a fuel cell (e.g., fuel cell 13) of fuel cell system 10, as described above for first shunt 700, shunt 800, shunt 900, shunt 1000, and shunt 1100.

Shunt 1200 may include a bottom portion 1201 having a longitudinal dimension aligned about parallel relative to a longitudinal dimension of an extending portion 1203 of an upper portion 1202. Upper portion 1202 may also include a connecting portion 1204 connecting extending portion with bottom portion 1201. Shunt 1200 may include multiple arms 1210 configured to dissipate heat generated by a flow of current therethrough.

Connecting portion 1204 may include arms 1222 located on opposite vertical sides thereof as depicted in the figures. Extending portion 1202 may include arms 1232 located on a vertical side thereof an arms 1233 located on a horizontal top side thereof with arms 1232 and 1233 being angled or chamfered.

Shunt 1200 may include a mounting member 1249 on extending portion 1202 having an opening 1250 configured to be connected (e.g., using a bolt, screw or other fastener) to a mounting bracket 1205 of fuel cell system 10. Mounting bracket 1205 may extend from a portion (e.g., a current collector plate or other plate) of a fuel cell (e.g., fuel cell 13) and may be electrically connected to fuel cell 10 to allow an electrical connection between such a portion of a fuel cell (e.g., a fuel cell plate) and shunt 1200.

Lower portion 1201 of shunt 1200 may have an opening 1240 configured to be connected (e.g., using a bolt, screw or other fastener) to a shunt control circuitry (e.g., contact circuitry 50), controller (e.g., a controller 70) and/or other control mechanism configured to control a shorting of one or more of fuel cells 13 of fuel cell system 10. Such control mechanism (e.g., controller 70) and shunt 1200 may be mounted to, and supported by, outside surface 12 of fuel cell system 10 or may be mounted to a mounting plate (e.g., a printed circuit card with electronic components thereon) extending out of and/or connected to fuel cell system 10.

A second shunt 1220 may be identical to shunt 1200 and may be connected to, and mounted to, a second mounting bracket 1206 connected to or integral with a second fuel cell plate, such as a collector plate, on an opposite side of MEA 530 relative to shunt 1200 to allow an electrical connection between the second shunt and the second fuel cell plate. Shunt 1220 may be connected (e.g., using a bolt, screw or other fastener) to a shunt control circuitry (e.g., shunt control circuitry 50), controller (e.g., a controller 70) and/or another control mechanism in a same manner as shunt 1200 described above. The connection between the shunts and the fuel cell plates and the shunts and the shunt control circuitry may allow shunting between opposite sides of such a fuel cell (e.g., fuel cell 13 to occur). Such current collector plates may be located in a same fuel cell or may be located in separate fuel cells (e.g., of several fuel cells 13) connected in series but having one or more additional fuel cells therebetween.

As depicted in FIG. 20, shunt 1200 may be connected to bracket 1205 of fuel cell 13 of fuel cell system 10 while shunt 1220 may be connected to bracket 1206 of a fuel cell 14 of fuel cell system 10 while a fuel cell system 15 may be located between fuel cell 13 and fuel cell 14. Bracket 1205 may be formed monolithically relative to, or connected to, a collector or conductive plate on a cathode side of fuel cell 13 while bracket 1206 may be formed monolithically relative to, or connected to, a collector or conductive plate on a cathode side of fuel cell 14 to allow a shunting of fuel cell 13, fuel cell 14 and fuel cell 15. In other examples, such shunting could include any number of fuel cells arranged in series in a fuel cell system or stack.

As indicated, shunt 1200 and shunt 1220 may be connectable to collector plates (e.g., collector plates 570) or other conductive portions on opposite sides of one or more membrane electrode assemblies of one or more fuel cells (e.g., fuel cell 13). Shunt 1200 may be connectable to an anode side (e.g. anode side 587) of a fuel cell (e.g., fuel cell 13) and the second shunt may be connectable to a cathode side (e.g., cathode side 577) of the fuel cell. Further the anode and cathode may be located in reversed positions and the shunts may be coupled to the anode and cathode sides in such positions.

Shunt 1200 may have a volume and surface area to provide a desired amount of resistance for the shunting process described. Further the arm locations and spacing may be sized and dimensioned based on such resistance along with a desired about of heat dissipation away from the shunt and fuel cell during use. The shunt may also be sized and dimensioned to allow a connection of the mounting member (e.g., mounting member 1249) to the mounting bracket (e.g., bracket 1205) and to allow a connection of the shunt (e.g., opening 1240 of lower portion 1201) to the shunt control circuitry and/or the controller.

The shunts described herein (e.g., 700, shunt 800, shunt 900, shunt 1000, shunt 1100, shunt 1200, shunt 1220) may include any type of electrical and mechanical connector to allow such shunts to be supported by a fuel cell system and to be electrically connected to conductive portions (e.g., conductive fuel cell plates, non-permeable conduction plate, or bi-polar plate conductive fuel cell plate) thereof and a shunt circuitry and/or a controller to allow multiple such shunts to be located on opposite sides of an MEA to shunt electrical current relative to one or more fuel cells as desired. Such electrical connections could be simple contact, mechanical connection using mechanical fasteners (e.g., bolts, screws, etc.) welding or using a conductive adhesive.

The collector plates (e.g., collector pates 570) described above for a fuel cell (e.g., fuel cell 13) may be formed of copper gold, silver, aluminum, stainless steel, steel, nickel, titanium and brass and all prospective alloys of the aforementioned materials. The shunts may be formed of stainless steel, steel, and brass and all alloys of aluminum, copper, nickel, titanium, aluminum. The shunts may also be formed of tungsten, nitinol, nichrome various heater wire and element materials.

Further, the shunts (e.g., 700, shunt 800, shunt 900, shunt 1000, shunt 1100, shunt 1200, shunt 1220) may be configured to have a thickness, dimension and shape to connect to the appropriate portions of a fuel cell and to set a correct voltage level using inherent resistance while still have the ability to shed or dissipate the heat from the shunt to the surrounding environment without creating an elevated temperature that would be considered unsafe. The shunts may include fins, arms, bends, extensions, projections, spacing between arms thereof and may be formed of various materials to provide such a desired resistance and heat dissipation capacity without dissipating an unsafe amount of heat. In an example, the shunts may target a 15 mOhm per circuit, which may be specific to an 8 cell, 100A cell connection. In this example such shunts may be configured to dissipate about 5 watts continuously based on an 8 cell 100A cell connection.

The controller (i.e., controller 180) described above, could be any type of computing unit (e.g., a personal computer operating a WINDOWS operating system or Apple OSX operating system, a Unix system, a microprocessor (which may or may not utilize a BIOS or operating system) or a mobile computing device such as a tablet computer or smart phone) configured to communicate with and/or control a fuel cell (fuel cell 20), temperature sensors located on portions of the fuel cell including the plates thereof, an energy storage device (e.g., energy storage device 30), a balance of a plant, a fuel supply (e.g., a source of oxidants or fuel), a fan (e.g., fan 40), a blower (e.g., blower 50) and/or a load (e.g., load 60). Further, the controller (e.g., controller 180) could be a unit separate from the sensors, fan, blower, fuel cell stack, energy storage device, and load device. Moreover, such a controller could be part of one or more of these components (e.g., the sensors, fan, blower, fuel cell, load device, and energy storage device) or could be distributed between these devices and other connected systems, such as the balance of plant while the distributed portions of such controller could be coupled to each other to allow communication therebetween.

The load described above could be any type of stationary or moveable load device, such as an industrial electrical vehicle or forklift truck, battery charger, a cell tower backup power supply, an over-road vehicle or any other electrical load. The fuel cell (e.g., fuel cell system 10) could be any type of fuel cell such as a proton exchange membrane fuel cell, solid oxide fuel cell, or any other fuel cell as would be known by one of ordinary skill in the art. The energy storage device described above could be any type of battery or other way of storing energy such as a lithium ion battery, lead acid battery, air compression energy storage device, water storage device, capacitor, ultra-capacitor, or any other device for storing energy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference is made above to embodiments of the invention and specific language describing the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated and protected.

What is claimed is:

1. A fuel cell system comprising:
a plurality of fuel cells comprising a cathode and an anode, said plurality of fuel cells configured to produce electrical power having a current output and voltage output;
said plurality of fuel cells comprising a first conductive plate and a second conductive plate;
a shunt electrically connected to said first conductive plate and said second conductive plate for shunting voltage output between said cathode and said anode;
said shunt mounted to, and supported by, said plurality of fuel cells;
said shunt connected to a control mechanism to control a shorting of one or more fuel cells of said plurality of fuel cells, said control mechanism mounted to, and supported by, said plurality of fuel cells.

2. The system of claim 1 further comprising a first fuel cell of said plurality of fuel cells comprising said anode and said cathode.

3. The system of claim 2 wherein said first fuel cell comprises said first conductive plate and said second conductive plate.

4. The system of claim 2 wherein said shunt is mounted to, and supported by, said first fuel cell.

5. The system of claim 2 wherein said control mechanism is mounted to, and supported by, said first fuel cell.

6. The system of claim 1 wherein said shunt is connected to said first conductive plate and said control mechanism.

7. The system of claim 6 further comprising a second shunt connected to said second conductive plate and said control mechanism to allow the shorting.

8. The system of claim 1 wherein said plurality of fuel cells comprises a first fuel cell of said plurality of fuel cells comprising said anode and a second fuel cell of said plurality of fuel cells comprising said cathode.

9. The system of claim 8 wherein said plurality of fuel cells comprises a first outer fuel cell and second outer fuel cell located at opposite ends of said plurality of fuel cells arranged in series, wherein said first fuel cell and said second fuel cell are located between said first outer fuel cell and said second outer fuel cell.

10. The system of claim 8 wherein said first fuel cell comprises said first conductive plate and said second fuel cell comprises said second conductive plate.

11. The system of claim 8 wherein said shunt is mounted to, and supported by, said first fuel cell and/or said second fuel cell.

12. The system of claim 1 wherein said shunt comprises a conductor contacting said first conductive plate and said second conductive plate, said shunt comprising a mounting member mounting said shunt to said plurality of fuel cells.

13. The system of claim 1 wherein said shunt comprises a plurality of arms, each arm of said plurality of arms being vertically spaced from each other arm of the first plurality of arms to promote a cooling of said shunt during operation of said plurality of fuel cells.

14. A method for controlling a fuel cell system, comprising:
providing a plurality of fuel cells comprising a cathode and an anode, the plurality of fuel cells configured to produce electrical power having a current and voltage output;
mounting a shunt to the plurality of fuel cells such that the shunt is supported by the plurality of fuel cells;
electrically connecting the shunt to a first conductive plate and a second conductive plate of the plurality of fuel cells for shunting voltage output between the cathode and the anode; and
a control mechanism controlling a shorting of one or more fuel cells of the plurality of fuel cells, the control mechanism mounted to, and supported by, the plurality of fuel cells.

15. The method of claim 14 wherein the cathode comprises a cathode of a first fuel cell of the plurality of fuel cells and the anode comprises an anode of a second fuel cell of the plurality of fuel cells.

16. The method of claim 14 wherein a first fuel cell of the plurality of fuel cells comprises the anode and the cathode.

17. The method of claim 14 wherein the plurality of fuel cells comprises a first outer fuel cell and a second outer fuel cell located opposite ends of the plurality of fuel cells arranged in series, and wherein the first fuel cell and the second fuel cell are located between the first outer fuel cell and the second outer fuel cell.

18. The method of claim 14 wherein the mounting the shunt comprises connecting the shunt to the first conductive plate and the control mechanism.

19. The method of claim 18 further comprising connecting a second shunt to the second conductive plate and the control mechanism to allow the shorting.

20. The method of claim 14 further comprises a first plurality of arms of the shunt dissipating heat from the shunt.

* * * * *